(12) United States Patent
Maugans et al.

(10) Patent No.: US 6,281,289 B1
(45) Date of Patent: Aug. 28, 2001

(54) POLYPROPYLENE/ETHYLENE POLYMER FIBER HAVING IMPROVED BOND PERFORMANCE AND COMPOSITION FOR MAKING THE SAME

(75) Inventors: Rexford A. Maugans; Edward N. Knickerbocker; Kenneth B. Stewart, all of Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/456,595

(22) Filed: Dec. 8, 1999

Related U.S. Application Data
(60) Provisional application No. 60/111,443, filed on Dec. 8, 1998.

(51) Int. Cl.[7] .............................. C08F 8/00; C08L 23/00; C08L 23/04
(52) U.S. Cl. ........................................... 525/191; 525/240
(58) Field of Search ...................................... 525/191, 240

(56) References Cited

U.S. PATENT DOCUMENTS

| | | | |
|---|---|---|---|
| 4,584,347 | * | 4/1986 | Harpell et al. ................. 525/119 |
| 5,486,419 | * | 1/1996 | Clementini et al. ............. 428/397 |
| 6,080,818 | * | 6/2000 | Thakker et al. ................. 525/240 |

* cited by examiner

*Primary Examiner*—Nathan M. Nutter

(57) ABSTRACT

The subject invention is directed to fibers and polymer blend compositions having improved bonding performance. In particular, the subject invention pertains to a multiconstituent fiber comprising a blend of a polypropylene polymer and a high molecular weight (i.e. low melt index or melt flow) ethylene polymer. The subject invention further pertains to the use of the fiber and polymer blend composition which has improved bonding performance in various end-use applications, especially woven and nonwoven fabrics such as, for example, disposable incontinence garments and diapers. The fibers have good spinnability and provide fabrics having improved bond strength and elongation.

10 Claims, 20 Drawing Sheets

Inv Ex 1 (a)

Inv Ex 1 (b)

Comp Ex 4 (c)

Comp Ex 4 (d)

Inv Ex 1 (a)

Inv Ex 1 (b)

Comp Ex 4 (c)

Comp Ex 4 (d)

POLYPROPYLENE/ETHYLENE POLYMER FIBER HAVING IMPROVED BOND PERFORMANCE AND COMPOSITION FOR MAKING THE SAME

CROSS-REFERENCE TO RELATED APPLICATIONS

This application claims the priority benefit of US provisional application No. 60/111,443, filed Dec. 8, 1998, the disclosure of which is incorporated herein by reference, in its entirety.

FIELD OF THE INVENTION

This invention relates to polymer compositions having improved bonding performance. In particular, the subject invention pertains to a polymer composition comprising a blend of a polypropylene polymer and a high molecular weight (i.e. low melt index or melt flow) ethylene polymer. The subject invention further pertains to the use of the polymer blend composition which has improved bonding performance in various end-use applications, especially fibers, nonwoven fabrics and other articles fabricated from fibers (e.g., disposable incontinence garments and diapers). The fibers have good spinnability and provide a fabric having good bond strength and good elongation.

BACKGROUND

Fiber is typically classified according to its diameter. Monofilament fiber is generally defined as having an individual fiber diameter greater than 15 denier, usually greater than 30 denier per filament. Fine denier fiber generally refers to a fiber having a diameter less than 15 denier per filament. Microdenier fiber is generally defined as fiber having less than 100 microns diameter. The fiber can also be classified by the process by which it is made, such as monofilament, continuous wound fine filament, staple or short cut fiber, spun bond, and melt blown fiber.

A variety of fibers and fabrics have been made from thermoplastics, such as polypropylene, highly branched low density polyethylene (LDPE) made typically in a high pressure polymerization process, linear heterogeneously branched polyethylene (e.g., linear low density polyethylene made using Ziegler catalysis), blends of polypropylene and linear heterogeneously branched polyethylene, blends of linear heterogeneously branched polyethylene, and ethylene/vinyl alcohol copolymers.

Of the various polymers known to be extrudable into fiber, highly branched LDPE has not been successfully melt spun into fine denier fiber. Linear heterogeneously branched polyethylene has been made into monofilament, as described in U.S. Pat. No. 4,076,698 (Anderson et al.), the disclosure of which is incorporated herein by reference. Linear heterogeneously branched polyethylene has also been successfully made into fine denier fiber, as disclosed in U.S. Pat. No. 4,644,045 (Fowells), U.S. Pat. No. 4,830,907 (Sawyer et al.), U.S. Pat. No. 4,909,975 (Sawyer et al.) and. in U.S. Pat. No. 4,578,414 (Sawyer et al.), the disclosures of which are incorporated herein by reference. Blends of such heterogeneously branched polyethylene have also been successfully made into fine denier fiber and fabrics, as disclosed in U.S. Pat. No. 4,842,922 (Krupp et al.), U.S. Pat. No. 4,990,204 (Krupp et al.) and U.S. Pat. No. 5,112,686 (Krupp et al.), the disclosures of which are all incorporated herein by reference. U.S. Pat. No. 5,068,141 (Kubo et al.) also discloses making nonwoven fabrics from continuous heat bonded filaments of certain heterogeneously branched LLDPE having specified heats of fusion. While the use of blends of heterogeneously branched polymers produces improved fabric, the polymers are more difficult to spin without fiber breaks and/or dripping at the spinneret die.

U.S. Pat. Nos. 5,294,492 and 5,593,768 (Gessner), both incorporated herein by reference, describe a multiconstituent fiber having improved thermal bonding characteristics composed of a blend of at least two different thermoplastic polymers which form a continuous polymer phase and at least one noncontinuous polymer phase. In the claims, Gessner recites that the at least one noncontinuous phase occupies a substantial portion of the surface of the fiber made from the blend. But while we believe the claims in U.S. Pat. Nos. 5,294,492 and 5,593,768 specify, for example, a core-sheath configuration with respect to the polymer phases, the photomicrograph (FIG. 1 therein) shows an island-sea type phase configuration for the fiber cross-section. Further, we believe it is the continuous polymer phase (not the noncontinuous phase) which occupies a substantial portion of the surface of the fiber exemplified (but not claimed) by Gessner. Also, all of the Examples (and presumably FIG. 1 therein) consist of polypropylene polymer blended with ASPUN™ fiber grade LLDPE resins having a 12 or 26 g/10 minute $I_2$ melt index as supplied by The Dow Chemical Company. The exemplar polypropylene polymer used by Gessner was described a "controlled rheology" PP (i.e. a visbroken PP) having a melt flow rate of 26 and at least 90 percent by weight isotacticity.

U.S. Pat. No. 5,549,867 (Gessner et al.), incorporated herein by reference, describes the addition of a low molecular weight (i.e. high melt index or melt flow) polyolefin to a polyolefin with a molecular weight ($M_z$) of from 400,000 to 580,000 to improve spinning. The Examples set forth in Gessner et al. are all directed to blends of 10 to 30 weight percent of a lower molecular weight metallocene polypropylene with from 70 to 90 weight percent of a higher molecular weight polypropylene produced using a Ziegler-Natta catalyst.

U.S. Pat. No. 4,839,228 (Jezic et al.), incorporated herein by reference, describes biconstituent fibers having improved tenacity and hand composed of a highly crystalline polypropylene polymer with LDPE, HDPE or preferably LLDPE. The polyethylene resins are described to have a moderately high molecular weight wherein their $I_2$ melt index is in the range of from about 12 to about 120 g/10 minutes.

Also, fibers made from blends of visbroken polypropylene polymer and homopolymer high density polyethylene (HDPE) having an $I_2$ melt index of equal to greater than 5 g/10 minutes are known. Such blends are thought to function on the basis of the immiscibility of the olefin polymers.

WO 95/32091 (Stahl et al.) discloses a reduction in bonding temperatures by utilizing blends of fibers produced from polypropylene resins having different melting points and produced by different fiber manufacturing processes, e.g., meltblown and spunbond fibers. Stahl et al. claims a fiber comprising a blend of an isotactic propylene copolymer with a higher melting thermoplastic polymer.

WO 96/23838, U.S. Pat. Nos. 5,539,056 and 5,516,848, the disclosures of which are incorporated herein by reference, teach blends of an amorphous poly-α-olefin of Mw>150,000 (produced via single site catalysis) and a crystalline poly-α-olefin with Mw<300,000, (produced via single site catalysis) in which the molecular weight of the amorphous polypropylene is greater than the molecular weight of the crystalline polypropylene. Preferred blends are described to comprise about 10 to about 90 weight percent of amorphous polypropylene. The described blends are said to exhibit unusual elastomeric properties, namely an improved balance of mechanical strength and rubber recovery properties.

U.S. Pat. No. 5,483,002 and EP 643100, the disclosures of both of which are incorporated herein by reference, teach blends of a semi-crystalline propylene homopolymer having a melting point of 125 to 165° C. and a semi-crystalline propylene homopolymer having a melting point below 130° C. or a non-crystallizing propylene homopolymer having a glass transition temperature which is less than or equal to −10° C. These blends are said to have improved mechanical properties, notably impact strength.

Crystalline polypropylenes produced by single site catalysis have been reported to be particularly suited for fiber production. Due to narrow molecular weight distributions and low amorphous contents, higher spinning rates and higher tenacities have been reported. But, isotactic PP fibers, in general (and particularly when produced using single site catalyst) exhibit poor bonding performance.

U.S. Pat. No. 5,677,383 (Lai et al.), incorporated herein by reference, discloses blends of (A) at least one homogeneously branched ethylene polymer having a high slope of strain hardening coefficient and (B) at least one ethylene polymer having a high polymer density and some amount of a linear high density polymer fraction. The Examples set forth by Lai et al. are directed to substantially linear ethylene interpolymers blended with heterogeneously branched ethylene polymers. Lai et al. describe the use of their blends in a variety of end use applications, including fibers. The disclosed compositions preferably comprise a substantially linear ethylene polymer having a density of at least 0.89 grams/centimeters$^3$. But Lai et al. disclosed fabrication temperatures only above 165° C. In contrast, to preserve fiber integrity, fabrics are frequently bonded at temperatures less than 165° C. such that all of the crystalline material is not melted before or during the fiber bonding step.

While various olefin polymer compositions have found success in a number of fiber and fabric applications, the fibers made from such compositions would benefit from an improvement in bond strength, which would lead to stronger fabrics, and accordingly to increased value to the nonwoven fabric and article manufacturers, as well as to the ultimate consumer. But any benefit in bond strength must not be at the cost of a detrimental reduction in spinnability and fiber elongation nor a detrimental increase in the sticking of the fibers or fabric to equipment during processing.

SUMMARY OF THE INVENTION

We have discovered that the inclusion of a high molecular weight ethylene polymer into a polypropylene polymer provides a multiconstituent fiber and calendered fabric having an improved bond performance, while simultaneously maintaining excellent fiber spinning and elongation performance. Accordingly, the subject invention provides a fiber having a diameter in a range of from 0.1 to 50 denier and comprising:
(A) from about 0.5 percent to about 25 weight percent (by weight of the fiber) of at least one ethylene polymer having:
  i. an $I_2$ melt index less than or equal to 10 grams/10 minutes, preferably less than 5 g/10 minutes, more preferably less than or equal to 3 g/10 minutes, most preferably less than or equal to 1.5 g/10 minutes, especially less than or equal to 0.75 g/10 minutes and
  ii. a density of from about 0.85 to about 0.97 grams/centimeters$^3$, as measured in accordance with ASTM D792, (or a corresponding percent crystallinity in range of about 12 to about 81 percent by weight, as determined using differential scanning calorimetry (DSC)), and
(B) a polypropylene polymer, preferably a polypropylene polymer having a melt flow rate (MFR) in the range of about 1 to about 1000 grams/10 minutes, measured in accordance with ASTM D1238 at 230° C./2.16 kg, more preferably in range of about 5 to about 100 grams/10 minutes,
  with the proviso that where the ethylene polymer is an ethylene/α-olefin interpolymer having an $I_2$ melt index in the range of about 5 to about 10 g/10 minutes, the density of the ethylene/α-olefin polymer is greater than 0.87 g/cm$^3$, preferably greater than or equal to 0.90 g/cm$^3$, and more preferably greater than or equal to 0.94 g/cm$^3$, as measured in accordance with ASTM D792,
  with the proviso that where the ethylene polymer is an ethylene homopolymer or ethylene/α-olefin interpolymer having a density greater than or equal to 0.94 g/cm$^3$, as measured in accordance with ASTM D792, the $I_2$ melt index of the ethylene polymer is less than 5 g/10 minutes, preferably less than or equal to 3 g/10 minutes, more preferably less than or equal to 1.5 g/10 minutes, most preferably less than or equal to 0.75 g/10 minutes, and wherein the fiber is thermal bondable at 340 pounds/linear inch and a bond roll surface temperature in the range of 127 to 137° C.

In a particular aspect, the subject invention provides a fiber having a diameter in a range of from 0.1 to 50 denier, a continuous polymer phase and at least one discontinuous polymer phase which comprises:
(A) as the at least one discontinuous polymer phase, from about 0.1 percent to about 30 weight percent (by weight of the fiber) of at least one ethylene polymer having:
  i. an $I_2$ melt index less than or equal to 10 grams/10 minutes, and
  ii. a density of from about 0.85 to about 0.97 grams/centimeters$^3$, and
(B) as the continuous polymer phase, a polypropylene polymer,
  with the proviso that where the ethylene polymer is an ethylene/α-olefin interpolymer having an $I_2$ melt index in the range of about 5 to about 10 g/10 minutes, the density of the ethylene/α-olefin polymer is greater than 0.87 g/cm$^3$ (or has a DSC percent crystallinity greater than 13 weight percent), preferably greater than or equal to 0.90 g/cm$^3$ (or has a DSC percent crystallinity greater than 33 weight percent) and more preferably greater than or equal to 0.94 g/cm$^3$ (or has a DSC percent crystallinity greater than 60 weight percent),
  with the proviso that where the ethylene polymer is an ethylene homopolymer or ethylene/α-olefin interpolymer having a density greater than or equal to 0.94 g/cm3, the $I_2$ melt index of the ethylene polymer is less than 5 g/10 minutes,
  wherein, prior to any bonding operation, the continuous polymer phase constitutes more than 50 percent of the fiber surface area and the two polymer phases cross-sectionally provide an island-sea configuration, and wherein the fiber thermal bondable at 340 pounds/linear inch and a bond roll surface temperature the range of 127 to 137° C.

In specific embodiments, the discontinuous phase constitutes an amount of the fiber surface area which is within or less than 50 percent, preferably 25 percent, more preferably 10 percent of amount contained in the blend composition. That is, in such embodiments, the surface area percentage of the discontinuous phase polymer is insubstantial as it closely approximates the total composition weight percentage of the discontinuous phase polymer), as determined using an electron microscopy technique which may include selective staining to enhance resolution.

Preferably, the fiber of the invention will be prepared from a polymer blend composition comprising:

(A) at least one homogeneously branched ethylene polymer, more preferably at least one substantially linear ethylene/α-olefin interpolymer having:
  i. a melt flow ratio, $I_{10}/I_2$, $\geq 5.63$,
  ii. a molecular weight distribution, $M_w/M_n$, defined by the equation:

$$M_w/M_n \leq (I_{10}/I_2) - 4.63,$$

and
  iii. a critical shear rate at onset of surface melt fracture of at least 50 percent greater than the critical shear rate at the onset of surface melt fracture of a linear ethylene polymer having about the same $I_2$ and $M_w/M_n$, and which constitutes the discontinuous polymer phase, and
(B) at least one isotactic polypropylene propylene.

The subject invention further provides a method for improving the bonding strength of a fine denier fiber comprised of at least one polypropylene polymer, the method comprising providing in an intimate admixture therewith less than or equal to 22 weight percent, preferably less than or equal to 17 weight percent, more preferably less than or equal to 12 weight percent of at least one ethylene polymer having a density of from about 0.85 to about 0.97 g/cm$^3$ and an $I_2$ melt index of from about 0.01 to about 10 grams/10 minutes, with the proviso that where the ethylene polymer is an ethylene/α-olefin interpolymer having an $I_2$ melt index in the range of about 5 to about 10 g/10 minutes, the density of the ethylene/α-olefin polymer is greater than 0.87 g/cm$^3$ and with the proviso that where the ethylene polymer is an ethylene homopolymer or ethylene/α-olefin interpolymer having a density greater than or equal to 0.94 g/cm$^3$, the $I_2$ melt index of the ethylene polymer is less than 5 g/10 minutes.

The subject invention further provides a polymer composition having improved bond strength comprising:
(A) from about 0.1 percent to about 30 weight percent (by weight of the composition) of at least one ethylene polymer having:
  i. an $I_2$ melt index less than or equal to 10 grams/1 0 minutes, and
  ii. a density of from about 0.85 to 0.97 grams/centimeters$^3$, and
(B) a polypropylene polymer,
  with the proviso that where the ethylene polymer is an ethylene/α-olefin interpolymer having an $I_2$ melt index in the range of about 5 to about 10 g/10 minutes, the density of the ethylene/α-olefin polymer is greater than 0.87 g/cm$^3$ and with the proviso that where the ethylene polymer is an ethylene homopolymer or ethylene/α-olefin interpolymer having a density greater than or equal to 0.94 g/cm$^3$, the $I_2$ melt index of the ethylene polymer is less than 5 g/10 minutes.

The subject invention further provides a polymer composition of the invention, in the form of a fiber, fabric, nonwoven or woven article, rotomolded article, film layer, injection molded article, thermoformed article, blow molded article, injection blow molded article, or extrusion coating composition.

The inventive fibers and fabrics can be produced on conventional synthetic fiber or fabric processes (e.g., carded staple, spun bond, melt blown, and flash spun) and they can be used to produce fabrics having high elongation and tensile strength, without a significant sacrifice in fiber spinnability. As an unexpected surprise, the polymer blend exhibits excellent fiber spinnability even though the ethylene polymer is characterized as having a high molecular weight. In fact, excellent polymer blend spinnability is achieved even where the ethylene polymer itself is not spinnable into fine denier fibers (that is, diameters less than about 50 denier) when used alone.

It is also surprising that improved bond strength is obtained without commensurate reductions in elongation performance.

It is a further surprise that relative to known PP/HDPE blends, improved bond strengths are obtained at relatively low polymer densities and crystallinities.

It is still another surprise that inventive blends based on high molecular weight ethylene/aromatic vinyl interpolymers provide dramatically improved bond strengths relative to comparative blends based on ethylene/α-olefin interpolymers having comparable crystallinities and melt indexes.

As another surprise, the invention where the polypropylene polymer (B) is manufactured using a metallocene or single-site or constrained geometry catalyst system results in substantially stable bond strengths at about 340 pli in the bonding temperature range of from about 127 to about 137° C.

These and other embodiments are more fully described in the detailed description in conjunction with the following figures.

DETAILED DESCRIPTION OF THE INVENTION

Figure 1:
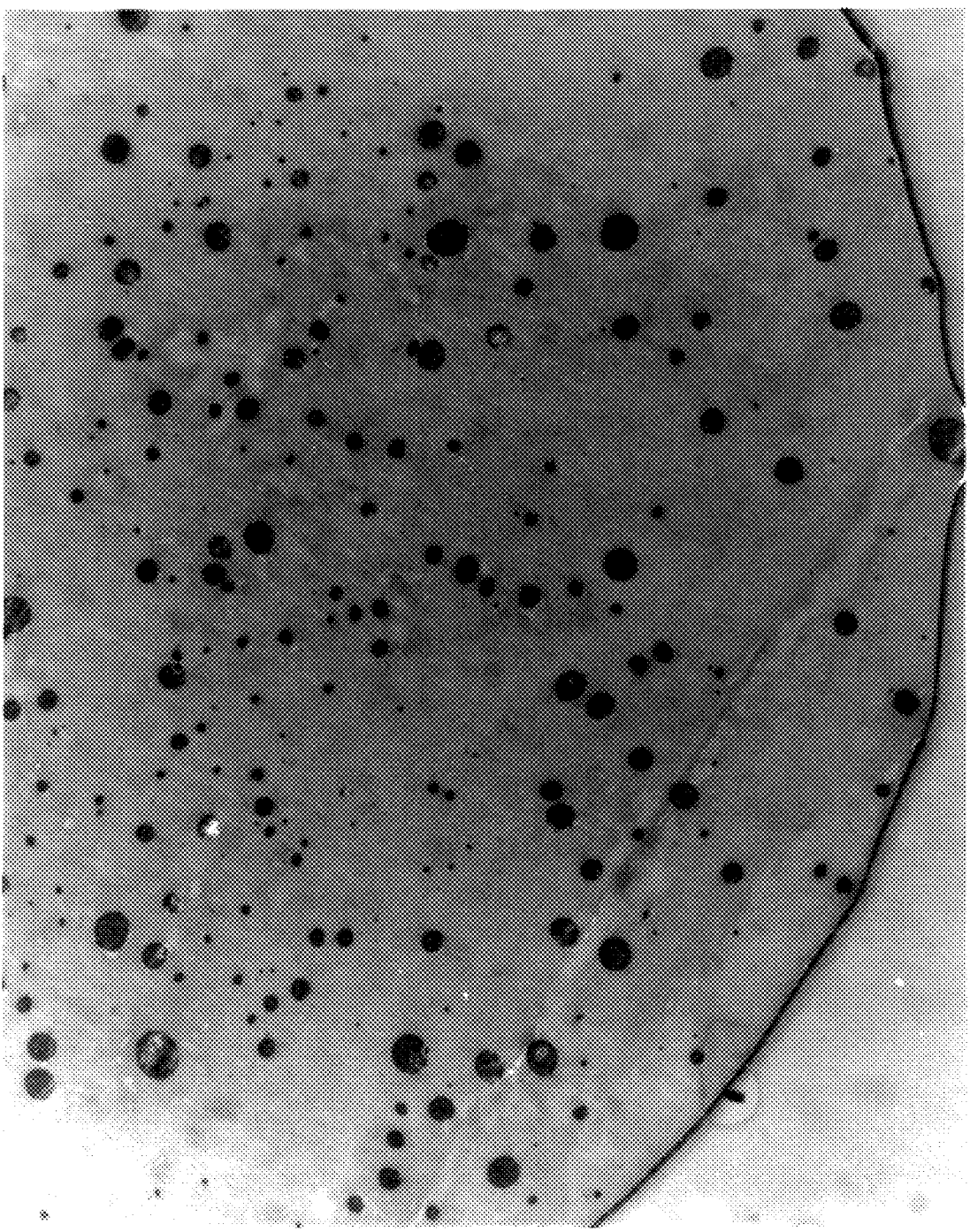
FIG. 1 is a transmission electron microscopy photomicrograph of the cross-section of an inventive fiber (Inventive Example 1) showing a continuous polypropylene polymer phase and discontinuous ethylene polymer (stained dark) phase.

The term "bonding" as used herein refers to the application of force or pressure (separate from or in addition to that required or used to draw fibers to less than or equal to 50 denier) to fuse molten or softened fibers together such that a bond strength of greater than or equal to 1,500 grams results.

The term "thermal bonding" is used herein refers to the reheating of staple fibers and the application of force or pressure (separate from or in addition to that required or used to draw fibers to less than or equal to 50 denier) to effect the melting (or softening) and fusing of fibers such that a bond strength of greater than or equal to 2,000 grams results. Operations that drawing and fuse fibers together in a single or simultaneous operation, or prior to any take-up roll (for example, a godet) such as, for example, spunbonding are not consider to be a thermal bonding operation, although the inventive fiber can have the form of or result from a spunbonding operation and similar fiber making operations.

The terms "visbroken" and "viscracked" are used herein in their conventional sense to refer to a reactor grade or product polypropylene polymer which is subsequently cracked or chain-scissioned prior to, during or by extrusion to provide a substantially higher melt flow rate. In the present invention, a viscracked polypropylene polymer will show a MFR change of 3:1, especially, 5:1 and more especially 7:1 in respect to the ratio of its subsequent MFR to initial MFR. For example, but the invention is not limited thereto, a reactor grade polypropylene polymer having a MFR of 4 can be used in the present invention where it is visbroken or viscracked to a MFR greater than about 20 (i.e., having a >20 visbroken MFR) prior to, during or by extrusion (for example, in an extruder immediately prior to a spinneret) in a conventional fiber making operation. In the present invention, to facilitate visbreaking, an initiator such as a peroxide (for example, but not limited to, Lupersol™ 101) and optionally antioxidant can be compounded with the initially low MFR polypropylene polymer prior to fiber making. In one embodiment, the polypropylene polymer is provided in powder form and the peroxide, antioxidant and ethylene polymer are admixed via a side-arm extrusion at the polypropylene polymer manufacturing facility. Polypropylene polymers having a visbroken melt flow rate are also referred to in the art as "controlled rheology polypropylene" (see, e.g., Gessner in U.S. Pat. No. 5,593,768) and initiator-assisted degraded polypropylene (see, e.g. Polypropylene Handbook, Hanser Publishers, New York (1996), the disclosure of which is incorporated by reference).

The term "reactor grade" is used herein in its conventional sense to refer to a virgin or additive modified polypropylene polymer which is not cracked or chain-scissioned after its initial production and as such its MFR will not be substantially changed during or by extrusion (for example, in an extruder immediately prior to a spinneret). In the present invention, reactor grade polypropylene will have MFR change during extrusion of less than 3:1, especially less than or equal to 2:1, more especially less than or equal to 1.5:1, most especially less than or equal to 1.25:1 with respect to the ratio of the polymer's subsequent MFR to its initial (before extrusion) MFR. In the present invention, reactor grade polypropylene polymers characterized as having a subsequent to initial MFR ratio of less than or equal to 1.25:1 typically contain an effective thermal stabilizer system such as, for example, but not limited to, 1 total weight percent Irganox™ 1010 phenolic antioxidant or Irgafos™ 168 phosphite stabilizer or both. Reactor grade polypropylene polymers characterized as having a relative low subsequent to initial MFR ratio are referred to in the art as "constant rheology polypropylene" (see Jezic et al. U.S. Pat. No. 4,839,228).

The term "excellent spinnability" is used herein to refer to the ability to produce high quality fine denier fibers using at least semi-commercial equipment (if not commercial equipment) at at least semi-commercial production rates (if not commercial production rates). Representative of excellent spinnability is producing fine denier fiber at greater than or equal to 750 meters/minute without any drips using the spinnability test described by Pinoca et al. in U.S. Pat. No. 5,631,083, the disclosure of which is incorporated herein by reference.

The term "stable bond strength" is used herein to mean that the thermal bond strength for the fabricated article (e.g. fiber) is in the range of 4,000 to 6,000 grams as determined at about 340 pli and bonding temperatures in the range of 127–137° C.

The term "fine denier fiber" is used herein to refer to fibers having a diameter less than or equal to 50 denier.

The polymer blend composition used to make the fiber and fabric of the present invention comprises at least one polypropylene polymer preferably a crystalline polypropylene polymer. The polypropylene polymer can be coupled, branched, visbroken or a reactor grade resin. The inventive composition comprises from about 70 to about 99.9 weight percent of at least one polypropylene polymer. In certain embodiments, inventive composition comprises equal to or greater than 78 weight percent, especially equal to or greater than 83 weight percent and more especially equal to or greater than 88 weight percent of at least one polypropylene polymer.

A crystalline polypropylene polymer is a polymer with at least about 90 mole percent of its repeating units derived from propylene, preferably at least about 97 percent, more preferably at least about 99 percent. The term "crystalline" is used herein to mean isotactic polypropylene having at least about 93 percent isotactic triads as measured by $^{13}C$ NMR, preferably at least about 95 percent, more preferably at least about 96 percent.

The polypropylene polymer comprises either homopolymer polypropylene or propylene polymerized with one or more other monomers addition polymerizable with propylene. The other monomers are preferably olefins, more preferably alpha olefins, most preferably ethylene or an olefin having a structure $RCH=CH_2$ where R is aliphatic or aromatic and has at least two and preferably less than about 18 carbon atoms. Hydrocarbon olefin monomers within the skill in the art, include hydrocarbons having one or more double bonds at least one of which is polymerizable with the alpha olefin monomer.

Suitable alpha olefins for polymerizing with propylene include 1-butene, 1-pentene, 1-hexene, 1-octene, 1-nonene, 1-decene, 1-unidecene, 1-dodecene and the like as well as 4-methyl-1-pentene, 4-methyl-1-hexene, 5-methyl-1-hexene, vinylcyclohexane, styrene and the like. The preferred alpha olefins include ethylene, 1-butene, 1-hexene, and 1-octene.

Optionally, but not in the most preferred embodiment of the present invention, the polypropylene polymer comprises monomers having at least two double bonds which are preferably dienes or trienes. Suitable diene and triene comonomers include 7-methyl-1,6-octadiene, 3,7-dimethyl-1,6-octadiene, 5,7-dimethyl-1,6-octadiene, 3,7,11-trimethyl-1,6,10-octatriene, 6-methyl-1,5-heptadiene, 1,3-butadiene, 1,6-heptadiene, 1,7-octadiene, 1,8-nonadiene, 1,9-decadiene, 1,10-undecadiene, norbornene, tetracyclododecene, or mixtures thereof, preferably butadiene, hexadienes, and octadienes, most preferably 1,4-hexadiene, 1,9-decadiene, 4-methyl-1,4-hexadiene, 5-methyl-1,4-hexadiene, dicyclopentactiene, and 5-ethylidene-2-norbornene.

Suitable polypropylenes are formed by means within the skill in the art, for example, using single site catalysts or Ziegler Natta catalysts. The propylene and optional alpha-olefin monomers are polymerized under conditions within the skill in the art, for instance as disclosed by Galli, et al., *Angew. Macromol. Chem.*, Vol. 120, 73 (1984), or by E. P. Moore, et al. in *Polypropylene Handbook*, Hanser Publishers, New York, 1996, particularly pages 11–98, the disclosures of which are incorporated herein by reference.

The polypropylene polymer used in the present invention is suitably of any molecular weight distribution (MWD). Polypropylene polymers of broad or narrow MWD are formed by means within the skill in the art. For fiber applications, generally a narrower MWD is preferred (for example, a $M_w/M_n$ ratio or polydispersity of less than or equal to 3). Polypropylene polymers having a narrow MWD can be advantageously provided by visbreaking or by manufacturing reactor grades (non-visbroken) using single-site catalysis or both.

Polypropylene polymers for use in the present invention preferably have a weight average molecular weight as measured by gel permeation chromatography (GPC) greater than about 100,000, preferably greater than about 115,000, more preferably greater than about 150,000, most preferably greater than about 250,000 to obtain desirably high mechanical strength in the final product.

Preferably, the polypropylene polymer has a melt flow rate (MFR) in the range of about 1 to about 1000 grams/10 minutes, more preferably in range of about 5 to about 100 grams/10 minutes, as measured in accordance with ASTM D1238 at 230° C./2.16 kg.

In general, for fiber making, especially fiber spinning, the melt flow rate of the polypropylene polymer is preferably greater than or equal to 20 g/10 minutes, more preferably greater than or equal to 25 g/10 minutes, and especially in the range of from about 25 to about 50 g/10 minutes, most especially from about 30 to about 40 g/10 minutes.

But specifically for staple fiber, the melt flow rate (MFR) of the polypropylene polymer is preferably in the range of about 10 to about 20 g/10 minutes. For spunbond fiber, the melt flow rate (MFR) of the polypropylene polymer is preferably in the range of about 20 to about 40 g/10 minutes. For melt blown fiber, the melt flow rate (MFR) of the polypropylene polymer is preferably in the range of about 500 to about 1500 g/10 minutes. For gel spun fiber, the melt flow rate (MFR) of the polypropylene polymer is preferably less than or equal to 1 g/10 minutes.

The polypropylene polymer used in the present invention can be branched or coupled to provide increased nucleation and crystallization rates. The term "coupled" is used herein to refer to polypropylene polymers which are rheology-modified such that they exhibit a change in the resistance of the molten polymer to flow during fiber making operation (for example, in the extruder immediately prior to the spinneret in a fiber spinning operation. Whereas "visbroken" is in the direction of chain-scission, "coupled" is in the direction of crosslinking or networking. An example of coupling is where a couple agent (for example, an azide compound) is added to a relatively high melt flow rate polypropylene polymer such that after extrusion the resultant polypropylene polymer composition attains a substantially lower melt flow rate than the initial melt flow rate. For the coupled or branched polypropylene used in the present invention the ratio of subsequent MFR to initial MFR is preferably less than or equal to 0.7:1, more preferably less than or equal to 0.2:1.

Suitable branched polypropylene for use in the present invention is commercially available for instance from Montell North America under the trade designations Profax PF-611 and PF-814. Alternatively, suitable branched or coupled polypropylene can be prepared by means within the skill in the art such as by peroxide or electron-beam treatment, for instance as disclosed by DeNicola et al. in U.S. Pat. No. 5,414,027 (the use of high energy (ionizing) radiation in a reduced oxygen atmosphere); EP 0 190 889 to Himont (electron beam irradiation of isotactic polypropylene at lower temperatures); U.S. Pat. No. 5,464,907 (Akzo Nobel NV); EP 0 754 711 Solvay (peroxide treatment); and U.S. patent application Ser. No. 09/133,576, filed August 13, 1998 (azide coupling agents); the disclosures of all of which are incorporated herein by reference.

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the. IUPAC system for numbering groups.

Preparation of crystalline polypropylene polymers is well within the skill, in the art. Advantageous catalysts for use in preparing narrow molecular weight distribution polypropylene polymers useful in the practice of the invention are preferably derivatives of any transition metal including Lanthanides, but preferably of Group 3, 4, or Lanthanide metals which are in the +2, +3, or +4 formal oxidation state. Preferred compounds include metal complexes containing from 1 to 3 Π-bonded anionic or neutral ligand groups, which are optionally cyclic or non-cyclic delocalized Π-bonded anionic ligand groups. Exemplary of such Π-bonded anionic ligand groups are conjugated or nonconjugated, cyclic or non-cyclic dienyl groups, and allyl groups. By the term "Π-bonded" is meant that the ligand group is bonded to the transition metal by means of its delocalized Π-electrons.

Each atom in the delocalized n-bonded group is optionally independently substituted with a radical selected from the group consisting of hydrogen, halogen, hydrocarbyl, halohydrocarbyl, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 hetero atom containing moiety. Included within the term "hydrocarbyl" are $C_1-C_{20}$ straight, branched and cyclic alkyl radicals, $C_6-C_{20}$ aromatic radicals, $C_7-C_{20}$ alkyl-substituted aromatic radicals, and $C_7-C_{20}$ aryl-substituted alkyl radicals. In addition two or more such adjacent radicals may together form a fused ring system, a hydrogenated fused ring system, or a metallocycle with the metal.

Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of advantageous hydrocarbyl-substituted organometalloid radicals include trimethylsilyl, triethylsilyl, ethyldimethylsilyl, methyldiethylsilyl, triphenylgermyl, and trimethylgermyl groups. Examples of Group 15 or 16 hetero atom containing moieties include amine, phosphine, ether or thioether moieties or monovalent derivatives thereof, e. g. amide, phosphide, ether or thioether groups bonded to the transition metal or Lanthanide metal, and bonded to the hydrocarbyl group or to the hydrocarbyl- substituted metalloid containing group.

Examples of advantageous anionic, delocalized Π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, and decahydroanthracenyl groups, as well as $C_1-C_{10}$ hydrocarbyl-substituted or $C_1-C_{10}$ hydrocarbyl-substituted silyl substituted derivatives thereof. Preferred anionic delocalized Π-bonded groups are cyclopentadienyl, pentamethylcyclopentadienyl, tetramethylcyclopentadienyl, tetramethylsilylcyclopentadienyl, indenyl, 2,3dimethylindenyl, fluorenyl, 2-methylindenyl, 2-methyl-4-phenytindenyl, tetrahydrofluorenyl, octahydrofluorenyl, and tetrahydroindenyl.

A preferred class of catalysts are transition metal complexes corresponding to the Formula A:

or a dimer thereof
wherein:

L is an anionic, delocalized, n-bonded group that is bound to M, containing up to 50 non-hydrogen atoms, optionally two L groups may be joined together forming a bridged structure, and further optionally one L is bound to X;

M is a metal of Group 4 of the Periodic Table of the Elements in the +2, +3 or +4 formal oxidation state;

X is an optional, divalent substituent of up to 50 non-hydrogen atoms that together with L forms a metallocycle with M;

X' at each occurrence is an optional neutral Lewis base having up to 20 non-hydrogen atoms and optionally one X'0 and one L may be joined together;

X" each occurrence is a monovalent, anionic moiety having up to 40 non-hydrogen atoms, optionally, two X" groups are covalently bound together forming a divalent dianionic moiety having both valences bound to M, or, optionally two X" groups are covalently bound together to form a neutral, conjugated or non-conjugated diene that is n-bonded to M (whereupon M is in the +2 oxidation state), or further optionally one or more X" and one or more X' groups are bonded together thereby forming a moiety that is both covalently bound to M and coordinated thereto by means of Lewis base functionality;

l is 0, 1 or 2;

m is 0 or 1;

n is a number from 0 to 3;

p is an integer from 0 to 3, and the sum, l+m+p, is equal to the formal oxidation state of M, except when two X" groups together form a neutral conjugated or non-conjugated diene that is Π-bonded to M, in which case the sum l+m is equal to the formal oxidation state of M.

Preferred complexes include those containing either one or two L groups.

The latter complexes include those containing a bridging group linking the two L groups. Preferred bridging groups are those corresponding to the formula $(ER^*_2)_x$ wherein E is silicon, germanium, tin, or carbon, R* independently each occurrence is hydrogen or a group selected from silyl, hydrocarbyl, hydrocarbyloxy and combinations thereof, said R* having up to 30 carbon or silicon atoms, and x is 1 to 8. Preferably, R* independently each occurrence is methyl, ethyl, propyl, benzyl, tert-butyl, phenyl, methoxy, ethoxy or phenoxy.

Examples of the complexes containing two L groups are compounds corresponding to the formula:

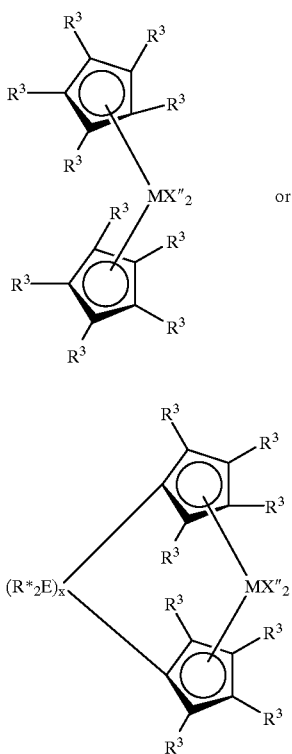

(AI)

(AII)

wherein:
M is titanium, zirconium or hafnium, preferably zirconium or hafnium; in the +2 or +4 formal oxidation state;
$R^3$ in each occurrence independently is selected from the group consisting, of hydrogen, hydrocarbyl, silyl, germyl, cyano, halo and combinations thereof, said $R^3$ having up to 20 non-hydrogen atoms, or adjacent $R^3$ groups together form a divalent derivative (e.g., a hydrocarbadiyl, germadiyl group) thereby forming a fused ring system, and V independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms forming α-complex with M, whereupon M is in the +2 formal oxidation state, and R*, E and x are as previously defined.

The foregoing metal complexes are especially suited for the preparation of polymers having stereoregular molecular structure. In such capacity it is preferred that the complex possesses $C_s$ symmetry or possesses a chiral, stereorigid structure. Examples of the first type are compounds possessing different delocalized Π-bonded systems, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.*, 110, pp. 6255–6256 (1980), incorporated herein by reference. Examples of chiral structures include rac bis-indenyl complexes. Similar systems based on Ti(IV) or Zr(IV) were disclosed for preparation of isotactic olefin polymers in Wild et al., *J. Organomet. Chem.*, 232, pp. 233–47, (1982), incorporated herein by reference.

Suitable bridged ligands containing two n-bonded groups are: (dimethylsilyl-bis(cyclopentadienyl)), (dimethylsilyl-bis(methylcyclopentadienyl)), (dimethylsilyl-bis(ethylcyclopentadienyl)), (dimethylsilyl-bis(t-butylcyclopentadienyl)), (dimethylsilyl-bis(tetramethylcyclopentadienyl)), (dimethylsilyl-bis(indenyl)), (dimethylsilyl-bis(tetrahydroindenyl)), (dimethylsilyl-bis(fluorenyl)), (dimethylsilyl-bis(tetrahydrofluorenyl)), (dimethylsilyl-bis(2-methyl-4-phenylindenyl)), (dimethylsilyl-bis(2-methylindenyl)), (dimethylsilyl-cyclopentadienyl-fluorenyl), (dimethylsilyl-cyclopentadienyl-octahydrofluorenyl), (dimethylsilyl-cyclopentadienyl-tetrahydrofluorenyl), (1,1,2,2-tetramethyl-1,2-disilyl-bis-cyclopentadienyl), (1,2-bis(cyclopentadienyl)ethane, and (isopropylidene-cyclopentadienyl-fluorenyl).

Preferred X" groups are selected from hydride, hydrocarbyl, silyl, germyl, halohydrocarbyl, halosilyl, silyl hydrocarbyl and aminohydrocarbyl groups, or two X" groups together form a divalent derivative of a conjugated diene or else together they form a neutral, Π-bonded, conjugated diene. Most preferred X" groups are $C_1-C_{20}$ hydrocarbyl groups, including those optionally formed from two X" groups together.

A further class of metal complexes corresponds to the preceding formula $L_lMX_mX'_nX''_p$, or a dimer thereof, wherein X is a divalent substituent of up to 50 non-hydrogen atoms that together with. L forms a metallocycle with M.

Preferred divalent X substituents include groups containing up to 30 non-hydrogen atoms comprising at least one atom that is oxygen, sulfur, boron or a member of Group 14 of the Periodic Table of the Elements directly attached to the delocalized Π-bonded group, and a different atom, selected from the group consisting of nitrogen, phosphorus, oxygen or sulfur that is covalently bonded to M.

A preferred class of such Group 4 metal coordination complexes corresponds to the formula: wherein:

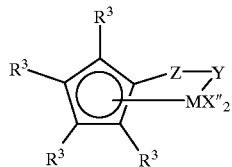

(AIII)

wherein:
M is titanium, zirconium or hafnium in the +2, +3 or +4 formal oxidation state;
X" and $R^3$ are as previously defined for formulas AI and AII;
Y is —O—, —S—, —NR*—, —NR*$_2$—, or —PR*—; and
Z is SiR*$_2$, CR*$_2$, SiR*$_2$SiR*$_2$, CR*$_2$CR*$_2$, CR*=CR*, CR*$_2$SiR*$_2$, or GeR*$_2$,
wherein R* is as previously defined.

Illustrative Group 4 metal complexes that are optionally used as catalysts include:
cyclopentadienyltitaniumtrimethyl,
cyclopentadienyltitaniumtriethyl,
cyclopentadienyltitaniumtriisopropyl,
cyclopentadienyltitaniumtriphenyl,
cyclopentadienyltitaniumtribenzyl,
cyclopentadienyltitanium-2,4-dimethylpentadienyl,
cyclopentadienyltitanium-2,4-dimethylpentadienyltriethylphosphine,
cyclopentadienyltitanium-2,4-dimethylpentadienyltriethylphosphine,
cyclopentadienyltitaniumdimethylmethoxide, cyclopentadienyltitaniumdimethylchloride, pentamethylcyclopentadienyltitaniumtrimethyl, indenyltitaniumtrimethyl, indenyltitaniumtriethyl, indenyltitaniumtripropyl, indenyltitaniumtriphenyl, tetrahydroindenyltitaniumtribenzyl, pentamethylcyclopentadienyltitaniumtriisopropyl, pentamethylcyclopentadienyltitaniumtribenzyl, pentamethylcyclopentadienyltitaniumdimethylmethoxide, pentamethylcyclopentadienyltitaniumdimethylchloride, bis(η5-2,4-dimethylpentadienyl) titanium, bis(η5-2,4-dimethylpentadienyl)titaniumtrimethylphosphine, bis (η5-2,4-dimethylpentadienyl)titaniumtriethylphosphine, octahydrofluorenyltitaniumtrimethyl, tetrahydroindenyltitaniumtrimethyl, tetrahydrofluorenyltitaniumtrimethyl, (tert-butylamido) (1,1-dimethyl-2,3,4,9,10—1,4,η5,6,7,8-hexahydronaphthalenyl)dimethylsilanetitaniumdimethyl, (tert-butylamido)(1,1,2,3-tetramethyl-2,3,4,9,10—1,4,5,6,7,8-hexahydronaphthalenyl) dimethylsilanetitaniumdimethyl, (tert-butylamido) (tetramethyl-η5-cyclopentadienyl) dimethylsilanetitanium dibenzyl, (tert-butylamido) (tetramethyl-η5-cyclopentadienyl) dimethylsilanetitanium dimethyl, (tert-butylamido) (tetramethyl-,η5-cyclopentadienyl)-1,2-ethanediyltitanium dimethyl, (tert-butylamido) (tetramethyl-η5-indenyl)dimethylsilanetitanium dimethyl, (tert-butylamido)(tetramethyl-η5-cyclopentadienyl)dimethylsilane titanium (III) 2-(dimethylamino)benzyl; (tert-butylamido)(tetramethyl-η5-cyclopentadienyl)dimethylsilanetitanium (III) allyl, (tert-butylamido)(tetramethyl-η5-cyclopentadienyl) dimethylsilanetitanium (III) 2,4-dimethylpentadienyl, (tert-butylamido)(tetramethyl-,η5-cyclopentadienyl) dimethyl-silanetitanium (II)1,4-diphenyl-1,3-butadiene, (tert-butylamido)(tetramethyl-η5-cyclopentadienyl) dimethyl-silanetitanium (II)1,3-pentadiene, (tert-butylamido)(2-methylindenyl)dimethylsilanetitanium (II) 1,4-diphenyl-1,3-butadiene, (tert-butylamido)(2-methylindenyl)dimethylsilanetitanium (II) 2,4-hexadiene, (tert-butylamido)(2-methylindenyl) dimethylsilanetitanium (IV) 2,3-dimethyl-1,3-butadiene, (tert-butylamido)(2-methylindenyl) dimethylsilanetitanium (IV)isoprene, (tert-butylamido) (2-methylindenyl)dimethylsilanetitanium 1,3-butadiene, (tert-butylamido)(2,3-dimethylindenyl) dimethylsilanetitanium (IV) 2,3-dimethyl-1,3-butadiene, (tert-butylamido)(2,3-dimethylindenyl) dimethylsilanetitanium (IV) isoprene; (tert-butylamido) (2,3-dimethylindenyl)dimethylsilanetitanium (IV) dimethyl; (tert-butylamido)(2,3-dimethylindenyl) dimethylsilanetitanium (IV) dibenzyl; (tert-butylamido) (2,3dimethylindenyl)dimethylsilanetitanium 1,3-butadiene,(tert-butylamido)(2,3-dimethylindenyl) dimethylsilanetitanium (11) 1,3-pentadiene, (tert-butylamido)(2,3-dimethylindenyl)dimethylsilanetitanium (11) 1,4-diphenyl-1,3-butadiene, (tert-butylamido)(2-methylindenyl)dimethylsilanetitanium (11) 1,3-pentadiene,(tert-butylamido)(2-methylindenyl) dimethylsilanetitanium (IV) dimethyl, (tert-butylamido) (2-methylindenyl)dimethylsilanetitanium (IV) dibenzyl, (tert-butylamido)(2-methyl-4-phenylindenyl) dimethylsilanetitanium (II) 1,4-diphenyl-1,3-butadiene, (tert-butylamido)(2-methyl-4-phenylindenyl) dimethylsilanetitanium (II) 1,3-pentadiene, (tert-butylamido)(2-methyl-4-phenylindenyl) dimethylsilanetitanium (II) 2,4-hexadiene, (tert-butylamido)(tetramethyl-η5-cyclopentadienyl)dimethyl-silanetitanium 1,3-butadiene, (tert-butylamido) (tetramethyl-i15-cyclopentadienyl)dimethyl-silanetitanium (IV) 2,3-dimethyl-1,3-butadiene, (tert-butylamido)(tetramethyl-η5-cyclopentadienyl)dimethyl-silanetitanium (IV) isoprene, (tert-butylamido) (tetramethyl-η5-cyclopentadienyl)dimethyl-silanetitanium (II) 1,4-dibenzyl-1,3-butadiene, (tert-butylamido)(tetramethyl-,η5-cyclopentadienyl)dimethyl-silanetitanium (II) 2,4-hexadiene, (tert-butylamido) (tetramethyl-η5-cyclopentadienyl)dimethyl-silanetitanium (II) 3-methyl-1,3-pentadiene, (tert-butylamido)(2,4-dimethylpentadien-3-yl)dimethyl-silanetitaniumclimethyl, (tert-butylamido)(6,6dimethylcyclohexadienyl)dimethyl-silanetitaniumdimethyl, (tert-butylamido)(1,1-dimethyl-2,3,4,9,10,1,4,5,6,7,8-hexahydronaphthalen4-yl) dimethylsilanetitaniumdimethyl, (tert-butylamido)(1,1,2,3-tetramethyl-2,3,4,9,10,1,4,5,6,7,8-hexahydronaphthalen4-yl) dimethylsilanetitaniumdimethyl(tert-butylamido) (tetramethyl-η5-cyclopentadienyl methylphenyl-silanetitanium (IV) dimethyl, (tert-butylamido) (tetramethyl-η5-cyclopentadienyl methylphenyl-silanetitanium (II) 1,4-diphenyl-1,3-butadiene, 1-(tert-butylamido)-2-(tetramethyl-η5-cyclopentadienyl) ethanediyl-titanium (IV) dimethyl, and 1-(tert-butylamido)-2-(tetramethyl-η5-cyclopentadienyl) ethanediyl-titanium (II) 1,4-diphenyl-1,3-butadiene.

Complexes containing two L groups including bridged complexes include: bis(cyclopentadienyl)zirconiumdimethyl, bis (cyclopentadienyl)zirconium dibenzyl, bis (cyclopentadienyl)zirconium methyl benzyl, bis (cyclopentadienyl)zirconiummethyl phenyl, bis (cyclopentadienyl)zirconiumdiphenyl, bis (cyclopentadienyl)titanium-allyl, bis(cyclopentadienyl) zirconiummethylmethoxide, bis(cyclopentadienyl) zirconiummethylchloride, bis (pentamethylcyclopentadienyl)zirconiumdime ethyl, bis (pentamethylcyclopentadienyl)titaniumdimethyl, bis (indenyl)zirconiumdimethyl, bis(indenyl) zirconiummethyl (2-(dimethylamino)benzyl), bis (indenyl)zirconium methyltrimethylsilyl, bis (tetrahydroindenyl)zirconium methyltrimethylsilyl, bis (pentamethylcyclopentadienyl)zirconiummethyl benzyl, bis(pentamethylcyclopentadienyl)zirconiumdibenzyl, bis (pentamethylcyclopentadienyl) zirconiummethylmethoxide, bis (pentamethylcyclopentadienyl) zirconiummethvylchloride, bis (methylethylcyclopentadienyl)zirconiumdimethyl, bis (butylcyclopentadienyl)zirconium dibenzyl, bis(t-butylcyclopentadienyl)zirconiumdimethyl, bis (ethyltetramethylcyclopentadienyl)zirconiumdimethyl, bis(methylpropylcyclopentadienyl)zirconium dibenzyl, bis(trimethylsilylcyclopentadienyl)zirconium dibenzyl, dimethylsilyl-bis(cyclopentadienyl)zirconiumdimethyl, dimethylsilyl-bis(tetramethylcyclopentadienyi)titanium-(III)allyl dimethylsilyl-bis(t-butylcyclopentadienyl) zirconiumdichloride, dimethylsilyl-bis(n-butylcyclopentadienyl)zirconiumdichloride, (methylene-bis(tetramethylcyclopentadienyl)titanium(III) 2-(dimethylamino)benzyl, (methylene-bis(n-butylcyclopentadienyl)titanium(III) 2-(dimethylamino) benzyl, dimethylsilyl-bis(indenyl) zirconiumbenzylchloride, dimethylsilyl-bis(2- methylindenyl)zirconiumdimethyl, dimethylsilyl-bis(2-methyl-4-phenylindenyl)zirconiumdimethyl, dimethylsilyl-bis(2-methylindenyl)zirconium-1,4-diphenyl-1,3-butadiene, dimethylsilyl-bis(2-methyl-4-phenylindenyl)zirconium (II) 1,4-diphenyl-1,3-butadiene, dimethylsilyl-bis(tetrahydroindenyl)zirconium(II) 1,4-diphenyl-1,3-butadiene, dimethylsilyl-bis(fluorenyl)zirconiummethylchloride, dimethylsilyl-bis(tetrahydrofluorenyl)zirconium bis(trimethylsilyl), and dimethylsilyl(tetramethylcyclopentadienyi)(fluorenyl)zirconium dimethyl.

Other catalysts, especially catalysts containing other Group 4 metals, will, of course, be apparent to those skilled in the art.

Preferred metallocene species include constrained geometry metal complexes, including titanium complexes, and methods for their preparation as are disclosed in U.S. application Ser. No. 545,403, filed Jul. 3,1990 (EP-A416, 815); U.S. application Ser. No. 967,365, filed Oct. 28, 1992 (EP-A-514,828); and U.S. application Ser. No. 876,268, filed May 1, 1992, (EP-A-520,732), as well as U.S. Pat. Nos. 5,055,438; 5,057,475; 5,096,867; 5,064,802; 5,096,867; 5,132,380; 5,132,380; 5,470,993; 5,486,632; 5,132,380; and 5,321,106. The teachings of all the foregoing patents, publications and patent applications is hereby incorporated by reference in their entireties.

Metallocene catalysts are advantageously rendered catalytically active by combination with one or more activating cocatalysts, by use of an activating technique, or a combination thereof. Advantageous cocatalysts are those boron-containing cocatalysts within the skill in the art. Among the boron-containing cocatalysts are tri(hydrocarbyl)boron compounds and halogenated derivatives thereof, advantageously having from 1 to about 10 carbons in each hydrocarbyl or halogenated hydrocarbyl group, more especially perfluorinated tri(aryl)boron compounds, and most especially tris(pentafluorophenyl)borane), amine, phosphine, aliphatic alcohol and mercaptan adducts of halogenated tri ($C_1$–$C_{10}$ hydrocarbyl)boron compounds, especially such adducts of perfluorinated tri(aryl)boron compounds. Alternatively, the cocatalyst includes borates such as tetrapheny Borate having as counterions ammonium ions such as are within the skill in the art as illustrated by European Patent EP 672,688 (Canich, Exxon), published Sep. 20, 1995.

The cocatalyst can be used in combination with a tri (hydrocarbyl)aluminum compound having from 1 to 10 carbons in each hydrocarbyl group or an oligomeric or polymeric alumoxane. It is possible to employ these aluminum compounds for their beneficial ability to scavenge impurities such as oxygen, water, and aldehydes from the polymerization mixture. Preferred aluminum compounds include trialkyl aluminum compounds having from 2 to 6 carbons in each alkyl group, especially those wherein the alkyl groups are ethyl, propyl, isopropyl, n-butyl, isobutyl, pentyl, neopentyl, or isopentyl, and methylalumoxane, modified by methylalumoxane (that is methylalumoxane modified by reaction with triisobutyl aluminum) (MMAO) and diisobutylalumoxane. The molar ratio of aluminum compound to metal complex is preferably from 1:10,000 to 1000:1, more preferably from 1:5000 to 100:1, most preferably from 1:100 to 100:1.

Cocatalysts; are used in amounts and under conditions within the skill in the art. Their use is applicable to all processes within the skill in the art, including solution, slurry, bulk (especially propylene), and gas phase polymerization processed. Such processes include those fully disclosed in the references cited previously.

The molar ratio of catalyst/cocatalyst or activator employed preferably ranges from about 1:10,000 to about 100:1, more preferably from about 1:5000 to about 10:1, most preferably from about 1:1000 to about 1:1.

When utilizing such strong Lewis acid cocatalysts; to polymerize higher (α-olefins, especially propylene, it has been found especially desirable to also contact the catalyst/cocatalyst mixture with a small quantity of ethylene or hydrogen (preferably at least one mole of ethylene or hydrogen per mole of metal complex, suitably from 1 to 100,000 moles of ethylene or hydrogen per mole of metal complex). This contacting may occur before, after or simultaneously to contacting with the higher α-olefin. If the foregoing Lewis acid activated catalyst compositions are not treated in the foregoing manner, either extremely long induction periods are encountered or no polymerization at all results. The ethylene or hydrogen may be used in a suitably small quantity such that no significant affect on polymer properties is observed.

In most instances, the polymerization advantageously takes place at conditions known in the prior art for Ziegler-Natta or Kaminsky-Sinn type polymerization reactions, i.e., temperatures from 0–250° C. and pressures from atmospheric to 3000 atmospheres. Suspension, solution, slurry, gas phase or high pressure, whether employed in batch or continuous form or under other process conditions, including the recycling of condensed monomers or solvent, may be employed if desired. Examples of such processes are well known in the art for example, WO 88/02009-A1 or U.S. Pat. No. 5,084,534 (both incorporated herein by reference), disclose conditions that are advantageously employed with the polymerization catalysts and are incorporated herein by reference in their entireties. A support, especially silica, alumina, or a polymer (especially polytetrafluoroethylene or a polyolefin) is optionally employed, and desirably is employed when the catalysts are used in a gas phase polymerization process. Such supported catalysts are advantageously not affected by the presence of liquid aliphatic or aromatic hydrocarbons such as are optionally present under the use of condensation techniques in a gas phase polymerization process. Methods for the preparation of supported catalysts are disclosed in numerous references, examples of which are U.S. Pat. Nos. 4,808,561; 4,912,075; 5,008,228; 4,914,253; and 5,086,025 (all incorporated herein by reference) and are suitable for the preparation of supported catalysts.

In such a process the reactants and catalysts are optionally added to the solvent sequentially, in any order, or alternatively one or more of the reactants or catalyst system components are premixed with solvent or material preferably miscible therewith then mixed together or into more solvent optionally containing the other reactants or catalysts. The preferred process parameters are dependent on the monomers used and the polymer desired.

Propylene is added to the reaction vessel in predetermined amounts to achieve predetermined per ratios, advantageously in gaseous form using a joint mass flow controller. Alternatively propylene or other liquid monomers are added to the reaction vessel in amounts predetermined to result in ratios desired in the final product. They are optionally added together with the solvent (if any), alpha-olefin and functional comonomer, or alternatively added separately. The pressure in the reactor is a function of the temperature of the reaction mixture and the relative amounts of propylene and/or other monomers used in the reaction. Advantageously, the polymerization process is carried out at a pressure of from about 10 to about 1000 psi (70 to 7000 kPa), most preferably from about 140 to about 550 psi (980 to 3790 kPa). The polymerization is then conducted at a temperature of from 25 to 200° C., preferably from 50 to 100° C., and most preferably from 60 to 80° C.

The process is advantageously continuous, in which case the reactants are added continuously or at intervals and the catalyst and, optionally cocatalyst, are added as needed to maintain reaction or make up loss or both.

Solution polymerization or bulk polymerization is preferred. In the latter case liquid polypropylene is the reaction medium. Preferred solvents include mineral oils and the various hydrocarbons which are liquid at reaction temperatures. Illustrative examples of useful solvents include straight- and branched-chain hydrocarbons such as alkanes, e.g. isobutane, butane, pentane, isopentene, hexane, heptane, octane and nonane, as well as mixtures of alkanes including kerosene and Isopar E, available from Exxon Chemicals Inc.; cyclic and alicyclic hydrocarbons such as cyclopentane, cyclohexane, methylcyclohexane, methylcycloheptane, and mixtures thereof; and aromatics and alkyl-substituted aromatic compounds such as benzene, toluene, xylenes, ethylbenzene, diethylbenzene, and the like; and perfluorinated hydrocarbons such as perfluorinated $C_4$–$C_{10}$ alkanes. Suitable solvents may include liquid olefins which may act as monomers or comonomers. Mixtures of the foregoing are also suitable.

At all times, the individual ingredients as well as the recovered catalyst components are protected from oxygen and moisture. Therefore, the catalyst components and catalysts are prepared and recovered in an oxygen- and moisture-free atmosphere. Preferably, therefore, the reactions are performed in the presence of a dry, inert gas such as, for example, nitrogen.

Without limiting in any way the scope of the invention, one means for carrying out such a polymerization process is as follows. In a stirred-tank reactor, olefin monomer is introduced continuously together with solvent and polyene monomer. The reactor contains a liquid phase composed substantially of monomers together with any solvent or additional diluent. Catalyst and cocatalyst are continuously introduced in the reactor liquid phase. The reactor temperature and pressure may be controlled by adjusting the solvent/monomer ratio, the catalyst addition rate, as well as by cooling or heating coils, jackets or both. The polymerization rate is controlled by the rate of catalyst addition. The polymer product molecular weight is controlled, optionally, by controlling other polymerization variables such as the temperature, monomer concentration, or by a stream of hydrogen introduced to the reactor, as is well known in the art. The reactor effluent is contacted with a catalyst kill agent such as water or an alcohol. The polymer solution is optionally heated, and the polymer product is recovered by flashing off gaseous monomers as well as residual solvent or diluent at reduced pressure, and, if necessary, conducting further devolatilization in equipment such as a devolatilizing extruder. In a continuous process, the mean residence time of the catalyst and polymer in the reactor generally is from about 5 minutes to 8 hours, and preferably from 10 minutes to 6 hours.

Preferably, the polymerization is conducted in a continuous solution polymerization system, optionally comprising more than one reactor connected in series or parallel.

The ethylene polymer used in the polymer blend composition to make the fiber and fabric of the present invention is characterized as having a high molecular weight. Suitable ethylene polymers include, for example, high density polyethylene (HDPE), heterogeneously branched linear low density polyethylene (LLDPE), heterogeneously branched ultra low density polyethylene (ULDPE), homogeneously branched linear ethylene polymers, homogeneously branched substantially linear ethylene polymers, homogeneously branched long chain branched ethylene polymers, and ethylene vinyl or vinylidene aromatic monomer interpolymers. But homogeneously branched ethylene polymers and ethylene vinyl or vinylidene aromatic monomer interpolymers are preferred, and homogeneously branched substantially linear ethylene polymers and substantially random ethylene/vinyl aromatic interpolymers are most preferred.

The homogeneously branched substantially linear ethylene polymers used in the polymer blend compositions disclosed herein can be interpolymers of ethylene with at least one $C_3$–$C_{20}$ α-olefin. The term "Interpolymer" and "ethylene polymer" used herein indicates that the polymer can be a copolymer, a terpolymer. Monomers usefully copolymerized with ethylene to make the homogeneously branched linear or substantially linear ethylene polymers include the $C_3$–$C_{20}$ α-olefin especially 1-pentene, 1-hexene, 4-methyl-1-pentene, and 1-octene. Especially preferred comonomers include I-pentene, I-hexene and 1-octene. Copolymers of ethylene and a $C_3$–$C_{20}$ α-olefin are especially preferred.

The term "substantially linear" means that the polymer backbone is substituted with 0.01 long chain branches/1000 carbons to 3 long chain branches/1000 carbons, more preferably from 0.01 long chain branches/1000 carbons to I long chain branches/1000 carbons, and especially from 0.05 long chain branches/1000 carbons to 1 long chain branches/1000 carbons.

Long chain branching is defined herein as a branch having a chain length greater than that of any short chain branches which are a result of comonomer incorporation. The long chain branch can be as long as about the same length as the length of the polymer back-bone.

Long chain branching can be determined by using $^{13}$C nuclear magnetic resonance (NMR) spectroscopy and is quantified using the method of Randall (*Rev. Macromol. Chem. Phys.*, C29 (2&3), p. 275–287), the disclosure of which is incorporated herein by reference.

In the case of substantially linear ethylene polymers, such polymers can be characterized as having:

a) a melt flow ratio, $I_{10}/I_2$, $\geq 5.63$, b) a molecular weight distribution, $M_w/M_n$, defined by the equation:

$$Mw/Mn \leq (I_{10}/I_2) - 4.63,$$

and c) a critical shear stress at onset of gross melt fracture greater than $4 \times 10^6$ dynes/cm$^2$ or a critical shear rate at onset of surface melt fracture at least 50 percent greater than the critical shear rate at the onset of surface melt fracture of either a homogeneously or heterogeneously branched linear ethylene polymer having about the same $I_2$ and $M_w/M_n$, or both.

In contrast to substantially linear ethylene polymers, linear ethylene polymers lack long chain branching, i.e., they have less than 0.01 long chain branches/1000 carbons. The term "linear ethylene polymers" thus does not refer to high pressure branched polyethylene, ethylene/vinyl acetate copolymers, or ethylene/vinyl alcohol copolymers which are known to those skilled in the art to have numerous long chain branches.

Linear ethylene polymers include, for example, the traditional heterogeneously branched linear low density polyethylene polymers or linear high density polyethylene polymers made using Ziegler polymerization processes (e.g., U.S. Pat. No. 4,076,698 (Anderson et al.)) the disclosure of which is incorporated herein by reference), or homogeneous linear polymers (e.g., U.S. Pat. No. 3,645,992 (Elston) the disclosure of which is incorporated herein by reference).

Both the homogeneous linear and the substantially linear ethylene polymers used to form the fibers have homogeneous branching distributions. The term "homogeneously branching distribution" means that the comonomer is randomly distributed within a given molecule and that substantially all of the copolymer molecules have the same ethylene/comonomer ratio. The homogeneous ethylene/α-olefin polymers used in this invention essentially lack a measurable "high density" fraction as measured by the TREF technique (i.e., the homogeneous branched ethylene/α-olefin polymers are characterized as typically having less than 15 weight percent, preferably less than 10 weight percent, and more preferably less than 5 weight percent of a polymer fraction with a degree of branching less than or equal to 2 methyls/1000 carbons).

The homogeneity of the branching distribution can be measured variously, including measuring the SCBDI (Short Chain Branch Distribution Index) or CDBI (Composition Distribution Branch Index). SCBDI or CDBI is defined as the weight percent of the polymer molecules having a comonomer content within 50 percent of the median total molar comonomer content. The CDBI of a polymer is readily calculated from data obtained from techniques known in the art, such as, for example, temperature rising elusion fractionation (abbreviated herein as "TREF) as described, for example, in Wild et al, *Journal of Polymer Science, Poly. Phys. Ed.*, Vol. 20, p. 441 (1982), U.S. Pat. No. 5,008,204 (Stehling), the disclosure of which is incorporated herein by reference. The technique for calculating CDBI is described in U.S. Pat. No. 5,322,728 (Davey et al.) and in U.S. Pat. No. 5,246,783 (Spenadel et al.), both disclosures of which are incorporated herein by reference. The SCBDI or CDBI for homogeneously branched linear and substantially linear ethylene polymers is typically greater than 30 percent, and is preferably greater than 50 percent, more preferably greater than 60 percent, even more preferably greater than 70 percent, and most preferably greater than 90 percent.

The homogeneous branched ethylene polymers used to make the fibers of the present invention will preferably have a single melting peak, as measured using differential scanning calorimetry (DSC), in contrast to heterogeneously branched linear ethylene polymers, which have 2 or more melting peaks, due to the heterogeneously branched polymer's broad branching distribution.

Substantially linear ethylene polymers exhibit a highly unexpected flow property where the $I_{10}/I_2$ value of the polymer is essentially independent of polydispersity index (i.e., $M_w/M_n$) of the polymer. This is contrasted with conventional homogeneous linear ethylene polymers and heterogeneously branched linear polyethylene resins for which one must increase the polydispersity index in order to increase the $I_{10}/I_2$ value. Substantially linear ethylene polymers also exhibit good processability and low pressure drop through a spinneret pack, even when using high shear filtration.

Homogeneous linear ethylene polymers useful to make the fibers and fabrics of the invention are a known class of polymers which have a linear polymer backbone, no long chain branching and a narrow molecular weight distribution. Such polymers are interpolymers of ethylene and at least one α-olefin comonomer of from 3 to 20 carbon atoms, and are preferably copolymers of ethylene with a $C_3$–$C_{20}$ α-olefin, and are most preferably copolymers of ethylene with propylene, 1-butene, 1-hexene, 4-methyl-1-pentene or 1-octene. This class of polymers is disclosed for example, by Elston in U.S. Pat. No. 3,645,992 and subsequent processes to produce such polymers using metallocene catalysts have been developed, as shown, for example, in EP 0 129 368, EP 0 260 999, U.S. Pat. Nos. 4,701,432; 4,937,301; 4,935,397; 5,055,438; and WO 90/07526, and others. The polymers can be made by conventional polymerization processes (e.g., gas phase, slurry, solution, and high pressure).

Another measurement useful in characterizing the molecular weight of ethylene polymers is conveniently indicated using a melt index measurement according to ASTM D-1238, Condition 190° C./10 kg (formerly known as "Condition (N)" and also known as $I_{10}$). The ratio of these two melt index terms is the melt flow ratio and is designated as $I_{10}/I_2$. For the substantially linear ethylene polymers used polymer compositions useful in making the fibers of the invention, the $I_{10}/I_2$ ratio indicates the degree of long chain branching, i.e., the higher the $I_{10}/I_2$ ratio, the more long chain branching in the polymer. The substantially linear ethylene polymers can have varying $I_{10}/I_2$ ratios, while maintaining a low molecular weight distribution (i.e., $M_w/M_n$ from 1.5 to 2.5). Generally, the $I_{10}/I_2$ ratio of the substantially linear ethylene polymers is at least 5.63, preferably at least 6, more preferably at least 7, and especially at least 8. Generally, the upper limit of $I_{10}/I_2$ ratio for the homogeneously branched substantially linear ethylene polymers is 50 or less, preferably 30 or less, and especially 20 or less.

Additives such as antioxidants (e.g., hindered phenolics (e.g., Irganox™1010 made by Ciba-Geigy Corp.), phosphites (e.g., Irgafos™) 168 made by Ciba-Geigy Corp.), cling additives (e.g., polyisobutylene (PIB)), antiblock additives, pigments, can also be included in the first polymer, the second polymer, or the overall polymer composition useful to make the fibers and fabrics of the invention, to the extent that they do not interfere with the enhanced fiber and fabric properties discovered by Applicants.

The molecular weight distributions of ethylene polymers are determined by gel permeation chromatography (GPC) on a Waters 150 C. high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å.; The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science Polymer Letters*, Vol. 6, p. 621, 1968) to derive the following equation:

$$M_{polyethylene} = a * (M_{polystyrene})^b.$$

In this equation, a=0.4316 and b=1.0. Weight average molecular weight, Mw, is calculated in the usual manner according to the following formula: $M_j = (\Sigma w_i(M_i^j))^j$; where $w_i$ is the weight fraction of the molecules with molecular weight $M_i$ eluting from the GPC column in fraction i and j=1 when calculating $_{Mw}$ and j=−1 when calculating $M_n$. The novel composition has $M_w/M_n$ less than or equal to 3.3, preferably less than or equal to 3, and especially in the range of from about 2.4 to about 3.

The $M_w/M_n$ of the substantially linear homogeneously branched ethylene polymers is defined by the equation:

$$M_w/M_n \leq (I_{10}/I_2) - 4.63$$

Preferably, the Mw/Mn for the ethylene polymers is from 1.5 to 2.5, and especially from 1.8 to 2.2.

An apparent shear stress versus apparent shear rate plot is used to identify the melt fracture phenomena. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture is characterized at the beginning of losing extrudate gloss at which the surface roughness of extrudate can only be detected by 40× magnification. The critical shear rate at onset of surface melt fracture for a substantially linear ethylene polymer is at least 50 percent greater than the critical shear rate at the onset of surface melt fracture of a homogeneous linear ethylene polymer having the same $I_2$ and $M_w/M_n$.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER.

The gas extrusion rheometer is described by M. Shida, R. N. Shroff and L. V. Cando in *Polymer Engineering Science*, Vol. 17, no. 11, p. 770 (1977), and in *Rheometers for Molten Plastics* by John Dealy, published by Van Nostrand Reinhold Co. (1982) on page 97, both publications of which are incorporated by reference herein in their entirety. All GER experiments are performed at a temperature of 190° C., at nitrogen pressures between 5250 to 500 psig using a 0.0296 inch diameter, 20:1 L/D die. An apparent shear stress vs. apparent shear rate plot is used to identify the melt fracture phenomena. According to Ramamurthy in *Journal of Rheology*, 30(2), pp. 337–357, 1986, above a certain critical flow rate, the observed extrudate irregularities may be broadly classified into two main types: surface melt fracture and gross melt fracture.

For the polymers described herein, the PI is the apparent viscosity (in Kpoise) of a material measured by GER at a temperature of 190° C., at nitrogen pressure of 2500 psig using a 0.0296 inch diameter, 20:1 L/D die, or corresponding apparent shear stress of 2.15×10⁶ dyne/cm².

The processing index is measured at a temperature of 190° C., at nitrogen pressure of 2500 psig using 0.0296 inch diameter, 20:1 L/D die having an entrance angle of 180°.

Exemplary constrained geometry catalysts for use in polymerizing the homogeneously branched substantially linear ethylene polymers preferentially used to make the novel fibers and other articles of the present invention preferably include those constrained geometry catalysts as disclosed in U.S. application Ser. Nos.: 545,403, filed Jul. 3, 1990; 758,654, now U.S. Pat. No. 5,132,380; 758,660, now abandoned, filed Sep. 12, 1991; and 720,041, now abandoned, filed Jun. 24,1991, and in U.S. Pat. Nos. 5,272, 236 and 5,278,272, the disclosures of all of which are incorporated herein by reference.

As indicated above, substantially random ethylene/vinyl aromatic interpolymers are especially preferred ethylene polymers for use in the present invention. Representative of substantially random ethylene/vinyl aromatic interpolymers are substantially random ethylene/styrene interpolymers preferably containing at least 20, more preferably equal to or greater than 30, and most preferably equal to or greater than 50 weight percent interpolymerized styrene monomer.

A substantially random interpolymer comprises in polymerized form i) one or more α-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s).

The term "interpolymer" is used herein to indicate a polymer wherein at least two different monomers are polymerized to make the interpolymer.

The term "substantially random" in the substantially random interpolymer resulting from polymerizing i) one or more α-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s) as used herein generally means that the distribution of the monomers of said interpolymer can be described by the Bernoulli statistical model or by a first or second order Markovian statistical model, as described by J. C. Randall in *Polymer Sequence Determination. Carbon-13 NMR Method*, Academic Press New York, 1977, pp. 71–78. Preferably, the substantially random interpolymer resulting from polymerizing one or more α-olefin monomers and one or more vinyl or vinylidene aromatic monomers, and optionally other polymerizable ethylenically unsaturated monomer(s), does not contain more than 15 percent of the total amount of vinyl or vinylidene aromatic monomer in blocks of vinyl or vinylidene aromatic monomer of more than 3 units. More preferably, the interpolymer is not characterized by a high degree of either isotacticity or syndiotacticity. This means that in the carbon-13 NMR spectrum of the substantially random interpolymer, the peak areas corresponding to the main chain methylene and methine carbons representing either meso diad sequences or racemic diad sequences should not exceed 75 percent of the total peak area of the main chain methylene and methine carbons.

By the subsequently used term "substantially random interpolymer" it is meant a substantially random interpolymer produced from the above-mentioned monomers.

Suitable α-olefin monomers which are useful for preparing the substantially random interpolymer include, for example, α-olefin monomers containing from 2 to 20, preferably from 2 to 12, more preferably from 2 to 8 carbon atoms. Preferred such monomers include ethylene, propylene, butene-1, 4-methyl-1-pentene, hexene-1 and octene-1. Most preferred are ethylene or a combination of ethylene with $C_3$–$C_8$ α-olefins. These α-olefins do not contain an aromatic moiety.

Suitable vinyl or vinylidene aromatic monomers which can be employed to prepare the substantially random interpolymer include, for example, those represented by the following formula I

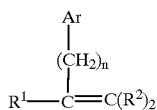
(formula 1)

wherein $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; Ar is a phenyl group or a phenyl group substituted with from 1 to 5 substituents; selected from the group consisting of halo, $C_1$–$C_4$-alkyl, and $C_1$–$C_4$-haloalkyl; and n has a value from zero to 4, preferably from zero to 2, most preferably zero. Particularly suitable such monomers include styrene and lower alkyl- or halogen-substituted derivatives thereof. Exemplary monovinyl or monovinylidene aromatic monomers include styrene, vinyl toluene, α-methylstyrene, t-butyl styrene or chlorostyrene, including all isomers of these compounds. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof. A more preferred aromatic monovinyl monomer is styrene.

By the term "sterically hindered aliphatic or cycloaliphatic vinyl or vinylidene monomers", it is meant addition polymerizable vinyl or vinylidene monomers corresponding to the formula:

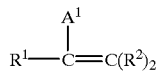

wherein $A^1$ is a sterically bulky, aliphatic or cycloaliphatic substituent of up to 20 carbons, $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; or alternatively $R^1$ and $A^1$ together form a ring system.

By the term "sterically bulky" is meant that the monomer bearing this substituent is normally incapable of addition polymerization by standard Ziegler-Natta polymerization catalysts at a rate comparable with ethylene polymerizations.

α-Olefin monomers containing from 2 to about 20 carbon atoms and having a linear aliphatic structure such as propylene, butene-1, hexene-1 and octene-1 are not considered as sterically hindered aliphatic monomers. Preferred sterically hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl or norbornyl. Most preferred sterically hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

The substantially random interpolymers usually contain from about 0.5 to about 65, preferably from about 1 to about 55, more preferably from about 2 to about 50 mole percent of at least one vinyl or vinylidene aromatic monomer and/or sterically hindered aliphatic or cycloaliphatic vinyl or vinylidene monomer and from about 35 to about 99.5, preferably from about 45 to about 99, more preferably from about 50 to about 98 mole percent of at least one aliphatic α-olefin having from about 2 to about 20 carbon atoms.

Other optional polymerizable ethylenically unsaturated monomer(s) include strained ring olefins such as norbornene and $C_1$–$C_{10}$-alkyl or $C_6$–$C_{10}$-aryl substituted norbornene, with an exemplary substantially random interpolymer being ethylene/styrene/norbornene.

The most preferred substantially random interpolymers are interpolymers of ethylene and styrene and interpolymers of ethylene, styrene and at least one α-olefin containing from 3 to 8 carbon atoms.

The number average molecular weight ($M_n$) of the substantially random interpolymers is usually greater than 5,000, preferably from about 20,000 to about 1,000,000, more preferably from about 50,000 to about 500,000. The glass transition temperature ($T_g$) of the substantially random interpolymers is preferably from about −40° C. to about +35° C., preferably from about 0° C. to about +30° C., most preferably from about +10° C. to about +25° C., measured according to differential mechanical scanning (DMS).

The substantially random interpolymers may be modified by typical grafting, hydrogenation, functionalizing, or other reactions well known to those skilled in the art. The polymers may be readily sulfonated or chlorinated to provide functionalized derivatives according to established techniques. The substantially random interpolymers may also be modified by various chain extending or crosslinking processes including, but not limited to peroxide-, silane-, sulfur-, radiation-, or azide-based cure systems. A full description of the various crosslinking technologies is described in copending U.S. patent application Ser. Nos. 08/921,641 and 08/921,642, both filed on Aug. 27, 1997, the entire contents of both of which are herein incorporated by reference.

Dual cure systems, which use a combination of heat, moisture cure, and radiation steps, may also be effectively employed. Dual cure systems are disclosed and claimed in U.S. patent application Ser. No. 536,022, filed on Sep. 29, 1995, in the names of K. L. Walton and S. V. Karande, incorporated herein by reference. For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc.

The substantially random interpolymers may also be modified by various crosslinking processes including, but not limited to the incorporation of a diene component as a termonomer in its preparation and subsequent crosslinking by the aforementioned methods and further methods including vulcanization via the vinyl group using sulfur for example as the cross linking agent.

One suitable method for manufacturing substantially random ethylene/vinyl aromatic interpolymers includes polymerizing a mixture of polymerizable monomers in the presence of one or more metallocene or constrained geometry catalysts in combination with various cocatalysts, as described in EP-A-0,416,815 by James C. Stevens et al. and U.S. Pat. No. 5,703,187 by Francis J. Timmers, both of which are incorporated herein by reference in their entirety. Preferred operating conditions for such polymerization reactions include pressures from atmospheric up to 3000 atmospheres and temperatures from −300° C. to 200° C. Polymerizations and unreacted monomer removal at temperatures above the auto-polymerization temperature of the respective monomers may result in formation of some amounts of homopolymer polymerization products resulting from free radical polymerization.

Examples of suitable catalysts and methods for preparing the substantially random interpolymers are disclosed in U.S. application Ser. No. 702,475, filed May 20, 1991 (EP-A-514,828); as well as U.S. Pat. Nos.: 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185, all of which patents and applications are incorporated herein by reference.

The substantially random ethylene/vinyl aromatic interpolymers can also be prepared by the methods described in JP 07/278230 (the disclosure of which is incorporated herein by reference) employing compounds shown by the general formula

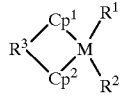

Where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to crosslink $Cp^1$ and $Cp^2$.

The substantially random ethylene/vinyl aromatic interpolymers can also be prepared by the methods described by John G. Bradfute et al. (W. R. Grace & Co.) in WO 95/32095; by R. B. Pannell (Exxon Chemical Patents, inc.) in WO 94/00500; and in Plastics Technology p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,869, filed Sep. 4, 1996, and WO 98/09999, both by Francis J. Timmers et al. These interpolymers contain additional signals in their carbon-13 NMR spectra with intensities greater than three times the peak to peak noise. These signals appear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-13 NMR peaks but with slightly different chemical shifts.

These interpolymers can be prepared by conducting the polymerization at temperatures of from about −30° C. to about 250° C. in the presence of such catalysts as those represented by the formula:

wherein each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to 30, preferably from about 1 to about 20, more preferably from about 1 to about 10 carbon or silicon atoms; each R' is independently, each occurrence, H, halo, hydrocarbyl, hydrocarbyloxy, silahydrocarbyl, hydrocarbylsilyl containing up to 30, preferably from about 1 to about 20, more preferably from about 1 to about 10 carbon or silicon atoms or two R' groups together can be a $C_1$–$C_{10}$ hydrocarbyl substituted 1,3-butadiene; M is 1 or 2; and optionally, but preferably in the presence of an activating cocatalyst.

Particularly, suitable substituted cyclopentadienyl groups include those illustrated by the formula:

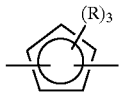

wherein each R is independently, each occurrence, H, hydrocarbyl, silahydrocarbyl, or hydrocarbylsilyl, containing up to 30, preferably from about 1 to about 20, more preferably from about 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl)zirconium dichloride, racemic-(dimethylsilanediyl)-bis-(2-methyl-4-phenylindenyl) zirconium 1,4diphenyl-1,3-butadiene, racemic-(dimethylsilanediyl)-bis-(2-methyl-4-phenylindenyl) zirconium di-$C_1$–$C_4$ alkyl, racemic-(dimethylsilanediyl)-bis-(2-methyl-4-phenylindenyl)zirconium di-$C_1$–$C_4$ alkoxide, or any combination thereof and the like.

It is also possible to use the following titanium-based constrained geometry catalysts, [n-(1,1-dimethylethyl)-1,1-dimethyl-I-[(1,2,3,4,5-η)-1,5,6,7-tetrahydro-s-indacen-I-yl] silanaminato(2-)-n]titanium dimethyl; (1-indenyl)(tert-butylamido)dimethyl-silane titanium dimethyl; ((3-tert-butyl)(1,2,3,4,5-η)-I-indenyl)(tert-butylamido) dimethylsilane titanium dimethyl; and ((3-iso-propyl)(1,2,3, 4,5-η)-I-indenyl)(tert-butyl amido)dimethylsilane titanium dimethyl, or any combination thereof and the like.

Further preparative methods for the interpolymers used in the present invention have been described in the literature. Longo and Grassi (*Makromol. Chem.* Volume 191, pages 2387 to 2396 [1990]) and D'Anniello et al. (*Journal of Applied Polymer Science*, Volume 58, pages 1701–1706 [1995]) reported the use of a catalytic system based on methylalumoxane (MAO) and cyclopentadienyl-titanium trichloride (CpTiCl$_3$) to prepare an ethylene-styrene copolymer. Xu and Lin (*Polymer Preprints Am. Chem. Soc., Div. Polym. Chem.*), Volume 35, pages 686,687 [1994]) have reported copolymerization using a MgCl$_2$/TiCl$_4$/NdCl$_3$/Al(iBu)$_3$ catalyst to give random copolymers of styrene and propylene. Lu et al (*Journal of Applied Polymer Science*, Volume 53, pages 1453 to 1460 [1994]) have described the copolymerization of ethylene and styrene using a TiCl$_4$/NdCl$_3$/MgCl$_2$/al(Et)$_3$ catalyst. Sernetz and Mulhaupt, (*Macromol. Chem. Phys.*, V. 197, pp. 1071–1083, 1997) have described the influence of polymerization conditions on the copolymerization of styrene with ethylene using Me$_2$Si(Me$_4$Cp)(n-tert-butyl)TiCl$_2$/Methylaluminoxane Ziegler-Natta catalysts. Copolymers of ethylene and styrene produced by bridged metallocene catalysts have been described by Arai, Toshiaki and Suzuki (*Polymer Preprints Am. Chem. Soc., Div. Polym. Chem.*), Volume 38, pages 349, 350 [1997]) and in U.S. Pat. No. 5,652,315, issued to Mitsui Toatsu Chemicals, Inc. The manufacture of α-olefin/vinyl aromatic monomer interpolymers such as propylene/styrene and butene/styrene are described in U.S. Pat. No. 5,244,996, issued to Mitsui Petrochemical Industries Ltd. or U.S. Pat. No. 5,652,315 also issued to Mitsui Petrochemical Industries Ltd. or as disclosed in DE 197 11339 A1 to Denki Kagaku Kogyo KK. All of the above disclosures of methods for preparing the interpolymer component are incorporated herein by reference. Also, although of high isotacticity and therefore not "substantially random", the random copolymers of ethylene and styrene as disclosed in *Polymer Preprints*, Vol. 39, no. 1, March 1998 by Toru Aria et al. (the disclosure of which is incorporated herein by reference) can also be employed as the ethylene polymer of the present invention.

While preparing the substantially random interpolymer, an amount of atactic vinyl aromatic homopolymer may be formed due to homopolymerization of the vinyl aromatic monomer at elevated temperatures. The presence of vinyl aromatic homopolymer is in general not detrimental for the purposes of the present invention and can be tolerated. The vinyl aromatic homopolymer may be separated from the interpolymer, if desired, by extraction techniques such as selective precipitation from solution with a non-solvent for either the interpolymer or the vinyl aromatic homopolymer. Nevertheless, for the purpose of the present invention, it is preferred that no more than 30 weight percent, preferably less than 20 weight percent (based on the total weight of the interpolymers) of atactic vinyl aromatic homopolymer be is present.

The polypropylene and ethylene polymers may be produced via a continuous (as opposed to a batch) controlled polymerization process using at least one reactor for each polymer. But the inventive polymer blend composition itself (or a blend comprising or constituting the polypropylene polymer and/or a separate blend comprising or constituting the ethylene polymer) can also be produced using multiple reactors (e.g., using a multiple reactor configuration as described in U.S. Pat. No. 3,914,342 (Mitchell), incorporated herein by reference), with the polypropylene polymer being manufactured in one reactor and the ethylene polymer being manufactured in at least one other reactor. The multiple reactors can be operated in series or in parallel, with at least one constrained geometry catalyst employed in at least one of the reactors at a polymerization temperature and pressure sufficient to produce the polypropylene polymer and/or the ethylene polymer having the desired properties.

According to a preferred embodiment of the present process, the polymers are produced in a continuous process, as opposed to a batch process. Preferably, the ethylene polymerization or interpolymerization temperature is from 20° C. to 250° C., using constrained geometry catalyst technology. If a narrow molecular weight distribution polymer ($M_w M_n$ of from 1.5 to 2.5) having a higher $I_{10}/I_2$ ratio (e.g. $I_{10}/I_2$ of 7 or more, preferably at least 8, especially at least 9) is desired, the ethylene concentration in the reactor is preferably not more than 8 percent by weight of the reactor contents, especially not more than 4 percent by weight of the reactor contents. Preferably, the polymerization is performed in a solution polymerization process. Generally, manipulation of $I_{10}/I_2$ while holding $M_w/M_n$ relatively low for producing the substantially linear polymers described herein is a function of reactor temperature and/or ethylene concentration. Reduced ethylene concentration and higher temperature generally produces higher $I_{10}/I_2$.

The polymerization conditions for manufacturing the homogeneous linear or substantially linear ethylene polymers used to make the fibers of the present invention are generally those useful in the solution polymerization process, although the application of the present invention is not limited thereto. Slurry and gas phase polymerization processes are also believed to be useful, provided the proper catalysts and polymerization conditions are employed.

One technique for polymerizing the homogeneous linear ethylene polymers useful herein is disclosed in U.S. Pat. No. 3,645,992 (Elston), the disclosure of which is incorporated herein by reference.

In general, the continuous polymerization useful for making the ethylene polymers used in the present invention may be accomplished at conditions well known in the prior art for Ziegler-Natta or Kaminsky-Sinn type polymerization reactions, that is, temperatures from 0 to 250° C. and pressures from atmospheric to 1000 atmospheres (100 MPa).

The compositions disclosed herein can be formed by any convenient method, including dry blending the individual components and subsequently melt mixing or by pre-melt mixing in a separate extruder (e.g., a Banbury mixer, a Haake mixer, a Brabender internal mixer, or a twin (or single) screw extruder, including pelletization extrusion). Preferably, the inventive composition is formed by melt mixing in a twin-screw co-rotating extruder.

Another suitable technique for making the composition is in-situ polymerization such as provided in pending U.S. Ser. No. 08/010,958, entitled "Ethylene Interpolymerizations", which was filed Jan. 29, 1993 in the names of Brian W. S. Kolthammer and Robert S. Cardwell, the disclosure of which is incorporated herein in its entirety by reference. U.S. Ser. No. 08/010,958 describes, inter alia, interpolymerizations of ethylene and $C_3$–$C_{20}$ alpha-olefins using a homogeneous catalyst in at least one reactor and a heterogeneous catalyst in at least one other reactor and this method can be adapted to employ a polypropylene polymerization reactor as a substitute for the heterogeneous catalyzed ethylene polymerization reactor or as an additional reactor. That is, the in situ polymerization can comprise at least three reactors where at least two reactors provide the ethylene polymer (as a polymer blend composition) and at least one reactor provide the reactor grade polypropylene polymer. For in situ polymerizations, the multiple reactors can be operated sequentially or in parallel. But preferably, when in situ polymerization is used it is only employed to provide suitable ethylene polymers (or ethylene polymer blend compositions) and not the inventive composition itself.

Preferably, the fiber of the invention will be a multiconstituent or multicomponent fiber. The inventive multiconstituent fiber can be staple fibers, spunbond fibers, melt blown fibers (using, e.g., systems as disclosed in U.S. Pat. Nos. 4,340,563 (Appel et al.), 4,663,220 (Wisneski et al.), 4,668,566 (Braun), 4,322,027 (Reba), 3,860,369, all of which are incorporated herein by reference), gel spun fibers (e.g., the system disclosed in U.S. Pat. No. 4,413,110 (Kavesh et al.), incorporated herein by reference), and flash spun fibers (e.g., the system disclosed in U.S. Pat. No. 3,860,369, the disclosure of which is incorporated herein by reference).

As defined in *The Dictionary of Fiber & Textile Technology*, by Hoechst Celanese Corporation, gel spinning refers to "[a] spinning process in which the primary mechanism of solidification is the gelling of the polymer solution by cooling to form a gel filament consisting of precipitated polymer and solvent. Solvent removal is accomplished following solidification by washing in a liquid bath. The resultant fibers can be drawn to give a product with high tensile strength and modulus."

As defined in *The Nonwoven Fabrics Handbook*, by John R. Starr, Inc., produced by INDA, Association of the Nonwoven Fabrics Industry, flash spinning refers to "a modified spunbonding method in which a polymer solution is extruded and rapid solvent evaporation occurs so that the individual filaments are disrupted into a highly fibrillar form and are collected on a screen to form a web."

Staple fibers can be melt spun (i.e., they can be extruded into the final fiber diameter directly without additional drawing), or they can be melt spun into a higher diameter and subsequently hot or cold drawn to the desired diameter using conventional fiber drawing techniques. The novel fibers disclosed herein can also be used as bonding fibers, especially where the novel fibers have a lower melting point than the surrounding matrix fibers. In a bonding fiber application, the bonding fiber is typically blended with other matrix fibers and the entire structure is subjected to heat, where the bonding fiber melts and bonds the surrounding matrix fiber. Typical matrix fibers which benefit from use of the novel fibers includes, but is not limited to: poly(ethylene terephthalate) fibers; cotton fibers; nylon fibers; other polypropylene fibers; other heterogeneously branched polyethylene fibers; and linear polyethylene homopolymer fibers. The diameter of the matrix fiber can vary depending upon the end use application.

The inventive multiconstituent fibers can also be used to provide a sheath/core bicomponent fiber (i.e., one in which the sheath concentrically surrounds the core). The inventive polymer blend can be in either the sheath or the core. Different inventive polymer blends can also be used independently as the sheath and the core in the same fiber and especially where the sheath component has a lower melting point than the core component. Other types of bicomponent fibers are within the scope of the invention as well, and include such structures as side-by-side fibers (e.g., fibers having separate regions of polymers, wherein the inventive polymer blend comprises at least a portion of the fiber's surface). One embodiment is in a bicomponent fiber wherein the polymer blend composition disclosed herein is provided in the sheath, and a higher melting polymer, such as polyester terephthalate or a different polypropylene is provided in the core.

The shape of the fiber is not limited. For example, typical fiber have a circular cross sectional shape, but sometimes fibers have different shapes, such as a trilobal shape, or a flat (i.e., "ribbon" like) shape. The fiber disclosed herein is not limited by the shape of the fiber.

Fiber diameter can be measured and reported in a variety of fashions. Generally, fiber diameter is measured in denier per filament. Denier is a textile term which is defined as the grams of the fiber per 9000 meters of that fiber's length. Monofilament generally refers to an extruded strand having a denier per filament greater than 15, usually greater than 30. Fine denier fiber generally refers to fiber having a denier of 15 or less. Microdenier (also referred to as "microfiber") generally refers to fiber having a diameter not greater than 100 micrometers. For the novel fibers disclosed herein, the diameter can be widely varied. But the fiber denier can be adjusted to suit the capabilities of the finished article and as such, would preferably be from 0.5 to 30 denier/filament for melt blown; from 1 to 30 denier/filament for spunbond; and from 1 to 20,000 denier/filament for continuous wound filament.

Fabrics made from the inventive fibers include both woven and nonwoven fabrics. Nonwoven fabrics can be made variously, including spunlaced (or hydrodynamically entangled) fabrics as disclosed in U.S. Pat. Nos. 3,485,706 (Evans) and 4,939,016 (Radwanski et al.), the disclosures of which are incorporated herein by reference; by carding and thermally bonding staple fibers; by spunbonding continuous fibers in one continuous operation; or by melt blowing fibers into fabric and subsequently calendering or thermally bonding the resultant web. These various nonwoven fabric manufacturing techniques are well known to those skilled in the art and the disclosure is not limited to any particular method. Other structures made from such fibers are also included within the scope of the invention, including e.g., blends of these novel fibers with other fibers (e.g., poly(ethylene terephthalate) (PET) or cotton).

Optional additive materials for use in the present invention include pigments, antioxidants, stabilizers, surfactants (e.g., as disclosed in U.S. Pat. Nos. 4,486,552 (Niemann), 4,578,414 (Sawyer et al.) or 4,835,194 (Bright et al.), the disclosures of all of which are incorporated herein by reference).

In preferred embodiments of the invention, at bonding temperatures lower than the peak elongation temperature (where peak elongation temperature is the temperature of the maximum elongation), fabrics prepared from fibers of the invention will exhibit a fabric elongation which is at least 20 percent, more preferably at least 50 percent, and most preferably at least 100 percent greater than that of fabric prepared with fibers prepared from the unmodified polypropylene used as the second polymer.

In preferred embodiments of the invention, at bonding temperatures at least 10° C. less than the peak strength bonding temperature (i.e., the bonding temperature of the maximum strength (tenacity)), fabrics prepared from fibers of the invention will exhibit a fabric strength which is at least 25 percent, more preferably at least 50 percent, and most preferably at least 70 percent higher than the a fabric prepared from fiber prepared from the unmodified polypropylene polymer used as the second polymer. The improvement is particularly important because attaining a given tenacity at a comparatively lower thermal bonding invariably promotes the highly desirably performance property of enhanced fabric softness.

In preferred embodiments of the invention, fibers of the invention will exhibit a spinnability (maximum draw rpms)

which is no more than 25 percent less than, more preferably no more than 15 percent less than the spinnability (maximum draw rpms) of fiber prepared from the unmodified polypropylene polymer used as the second polymer. Draw rpms may also be correlated to draw pressure on a spunbond process.

Useful articles which can be made from the polymer compositions disclosed herein include films, fibers, thermoformed articles, molded articles (for example, blow molded articles, injection molded articles and rotomolded articles) and coated articles (for example, extrusion coatings). Other useful articles included woven and nonwoven items such as those described in issued U.S. Pat. No. 5,472,775 (Obijeski et al.), incorporated herein by reference.

The subject invention is particularly usefully employed in the preparation of calendar roll bonded fabrics such as carded staple fabric or spunbonded fabrics. Exemplary enduse articles include, but not limited to, diaper and other personal hygiene article components, disposable clothing (such as hospital garments), durable clothing (such as insulated outerwear), disposable wipes, dishcloths, and filter media.

The subject invention is also usefully employed in the bonding of carpet or upholstery components, and in the bonding and/or strengthening of other webs (such as industrial shipping sacks, strapping and rope, lumber wraps, house/construction wraps, pool covers, geotextiles, and tarpaulins).

The subject invention may further find utility in adhesive formulations, optionally in combination with one or more tackifiers, plasticizers, or waxes.

EXAMPLES

In an evaluation to determine the effect of ethylene polymers on the fiber spinning, bonding and elongation properties of polypropylene polymers, a minor amount of various ethylene polymers were separately admixed with a Ziegler-catalyzed isotactic polypropylene polymer, INSPIRE™ H500-35, supplied by The Dow Chemical Company. The polypropylene polymer was supplied with a visbroken melt flow rate of 35 g/10 minutes at 230° C./2.16 kg. The various ethylene polymers used in the evaluation are listed in Table 1.

In this evaluation, polypropylene/ethylene polymer blends were prepared by tumble dry-blending followed by melt extrusion and pelletization. To the dry-blends, 1000 ppm Irgafos 168 was added via a 5 weight percent master batch concentrate comprising INSPIRE™ H500-35 as the carrier resin. The melt extrusion and pelletization were performed using a co-rotating twin-screw Werner Pflieder ZSK-30 (30 mm) extruder at a melt temperature of about 190° C. The extruder was equipped with positive conveyance elements and no negative conveyance elements. The resultant polymer blends and the control INSPIRE™ H500-35 polypropylene polymer (comparative example 4) were all meltspun into fiber. Table 2 provides the weight percentage information for the various examples.

TABLE 1

| Resin | Product Type/Designation | $I_2$, Melt Index, g/10 min. | Density, g/cm$^3$ |
|---|---|---|---|
| EP1 | ENGAGE 8150* | 0.5 | 0.87 |
| EP2 | ENGAGE 8100* | 1 | 0.87 |

TABLE 1-continued

| Resin | Product Type/Designation | $I_2$, Melt Index, g/10 min. | Density, g/cm$^3$ |
|---|---|---|---|
| EP3 | ENGAGE 8200* | 5 | 0.87 |
| EP4 | AFFINITY PL 1280* | 6 | 0.90 |
| EP5 | ESI | 5 | <15 wt. %‡ |
| EP6 | ENGAGE 8400* | 30 | 0.87 |
| EP7 | SLEP | 30 | 0.913 |
| EP8 | ASPUN 6811A | 27 | 0.941 |

‡Rather than density, the reported value is percent crystallinity as determined using differential scanning calorimetry (DSC).
Except for the ENGAGE elastomers, all of the above ethylene polymers are available from The Dow Chemical Company.
ESI denotes a substantially random ethylene/styrene interpolymer which contains about 30 weight percent styrene interpolymerized with ethylene.
SLEP denotes a homogeneously branched substantially linear ethylene/1-octene interpolymer manufactured using a constrained geometry catalyst system in a continuous polymerization reaction system.
ENGAGE is a trademark of Dupont-Dow Elastomers for ethylene elastomers.
AFFINITY is a trademark of The Dow Chemical Company for ethylene plastomers.
Both AFFINITY and ENGAGE resins are manufactured in a continuous polymerization reaction system.
ASPUN is a trademark of The Dow Chemical Company for fiber-grade linear low density polyethylene (LLDPE) resins manufactured using a Ziegler titanium catalysis system.

TABLE 2

| Example | Ethylene Polymer | Weight Percent Ethylene Polymer |
|---|---|---|
| Inv. Ex 1 | EP1 | 5 |
| Inv. Ex 2 | EP1 | 1 |
| Inv. Ex 3 | EP1 | 20 |
| Inv. Ex 5 | EP2 | 2 |
| Inv. Ex 6 | EP2 | 10 |
| Comp. Ex 7 | EP3 | 5 |
| Inv. Ex 8 | EP4 | 5 |
| Inv. Ex 9 | EP5 | 5 |
| Comp. Ex 10 | EP6 | 5 |
| Comp. Ex 11 | EP7 | 5 |
| Comp. Ex 12 | EP8 | 5 |
| Comp. Ex 13 | EP3 | 1 |
| Comp. Ex 14 | EP6 | 1 |
| Comp. Ex 15 | EP6 | 10 |

Fiber spinning was conducted on an Alex James laboratory scale spinning apparatus (available from Alex James, Inc.). The various example compositions were fed separately into a 1 inch×24 inches single screw extruder, with melt temperature varying from 195° C. to 220° C. The molten example compositions were forwarded to a Zenith gear pump at 1.752 cc/rev. and through a triple screen configuration (20/400/20 mesh). The molten example compositions then exited through a spinneret containing 108 holes, each with a diameter of 400 µm, wherein the $L/_D$ of the holes was 4/1. The molten example compositions were drawn-down at 0.37 grams/minute from each hole and air cooled by a quench chamber.

The drawn-down fibers were moved down 3 meters to a 6 inch diameter feed godet, then a 6 inch diameter winder godet. The godets were set to 2000–2200 rotations per minute (rpm), imparted no cold drawing and delivered fibers having diameters in the range of from about 3.0 to about 3.5 denier. Fiber samples were collected for 2 minutes on the second godet for each example composition and then cut from the godet. Each example was then cut into 1 inch to 1.5 inch lengths known as staple fibers and allowed to relax for minimum 24 hours to promote laboratory consistency.

All of the example compositions spun well, providing fine denier staple fibers. However, the good spinning performance of the Inventive Examples (all comprising an ethylene polymer having an $I_2$ melt index less than or equal to 5 g/10 minutes) was surprising because the various ethylene polymers used as the blend component for the inventive compositions do not spin on the above-described spinning apparatus when used alone. That is, as taught by Jezic et al. in U.S. Pat. No. 4,839,228, for successful fiber-spinning, ethylene polymers having an $I_2$ melt index greater than or equal to about 12 g/10 minutes are typically used and not the kind of high molecular weight ethylene polymers required in the present invention.

The staple fibers of each example composition were weighed out as 1.25 g specimens, typically 4–8 specimens per sample. The 1.25 g specimens were fed to a SpinLab Rotor Ring 580 set at maximum speed for 45 seconds to card the fibers and provide an initial web. After the first carding, the fibers were removed, re-fed to the SpinLab Rotor Ring 580 unit, and re-carded for another 45 seconds. After the second carding, a 3.5 inch fiber web for each example was removed and placed in a 3.5 inch by 12 inch metal feed tray.

Figure 2:
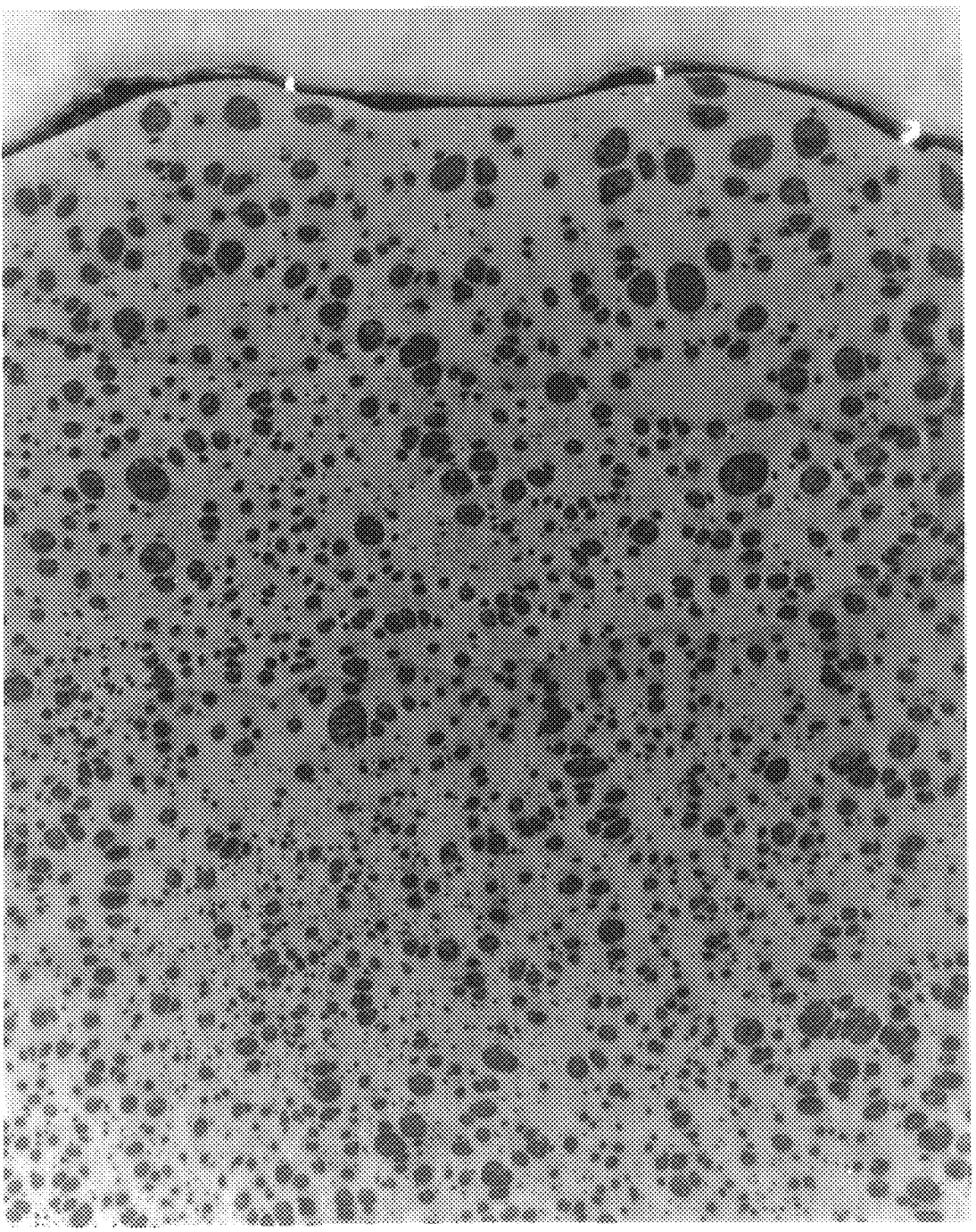
FIG. 2 is a transmission electron microscopy photomicrograph of the cross-section of an inventive fiber (Inventive Example 3) showing a continuous polypropylene polymer phase and discontinuous ethylene polymer (stained dark) phase.
Figure 3:
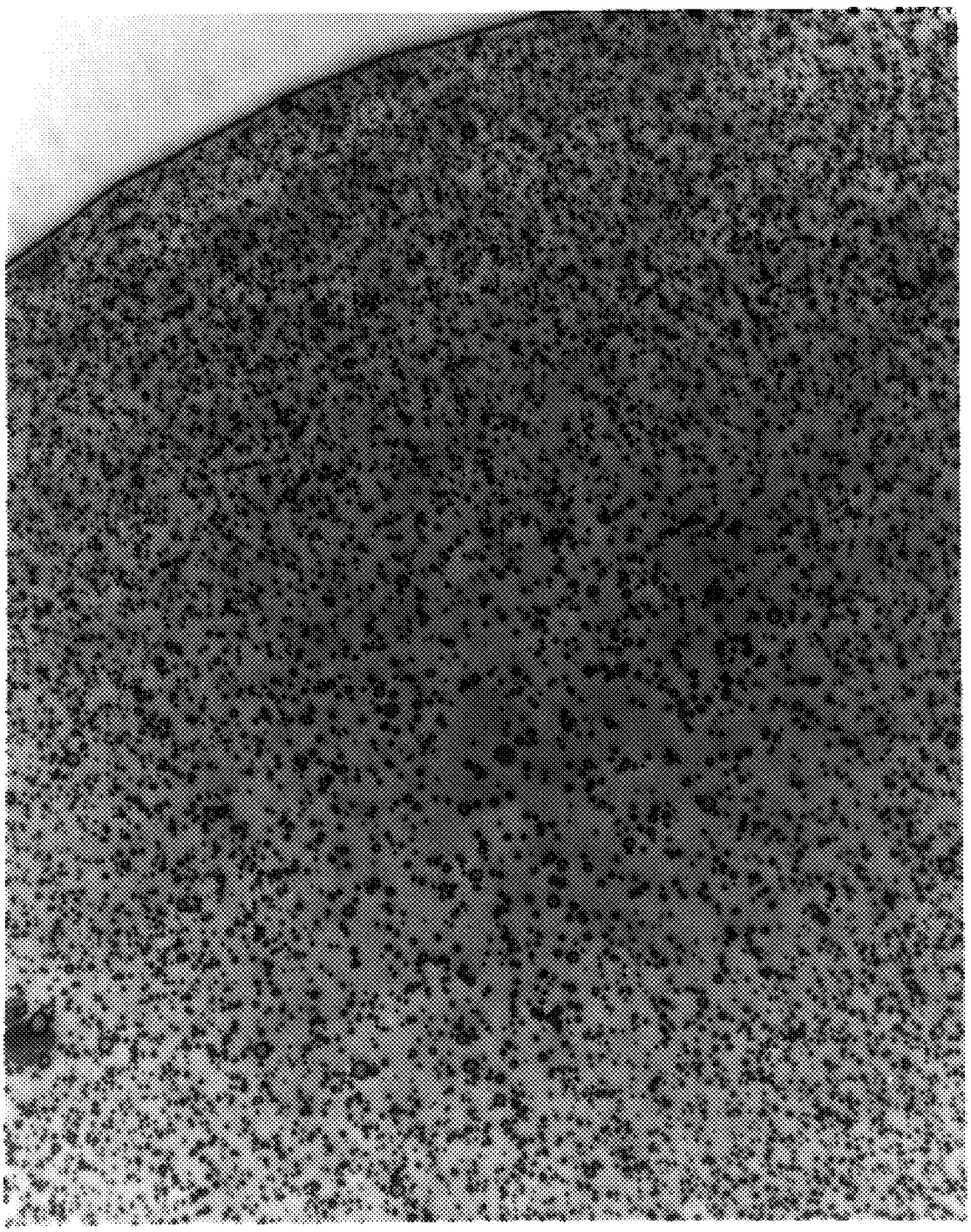
FIG. 3 is a transmission electron microscopy photomicrograph of the cross-section of an inventive fiber (Inventive Example 9) showing a continuous polypropylene polymer phase and discontinuous ethylene polymer (particles with stained dark peripheries) phase.
Figure 4:
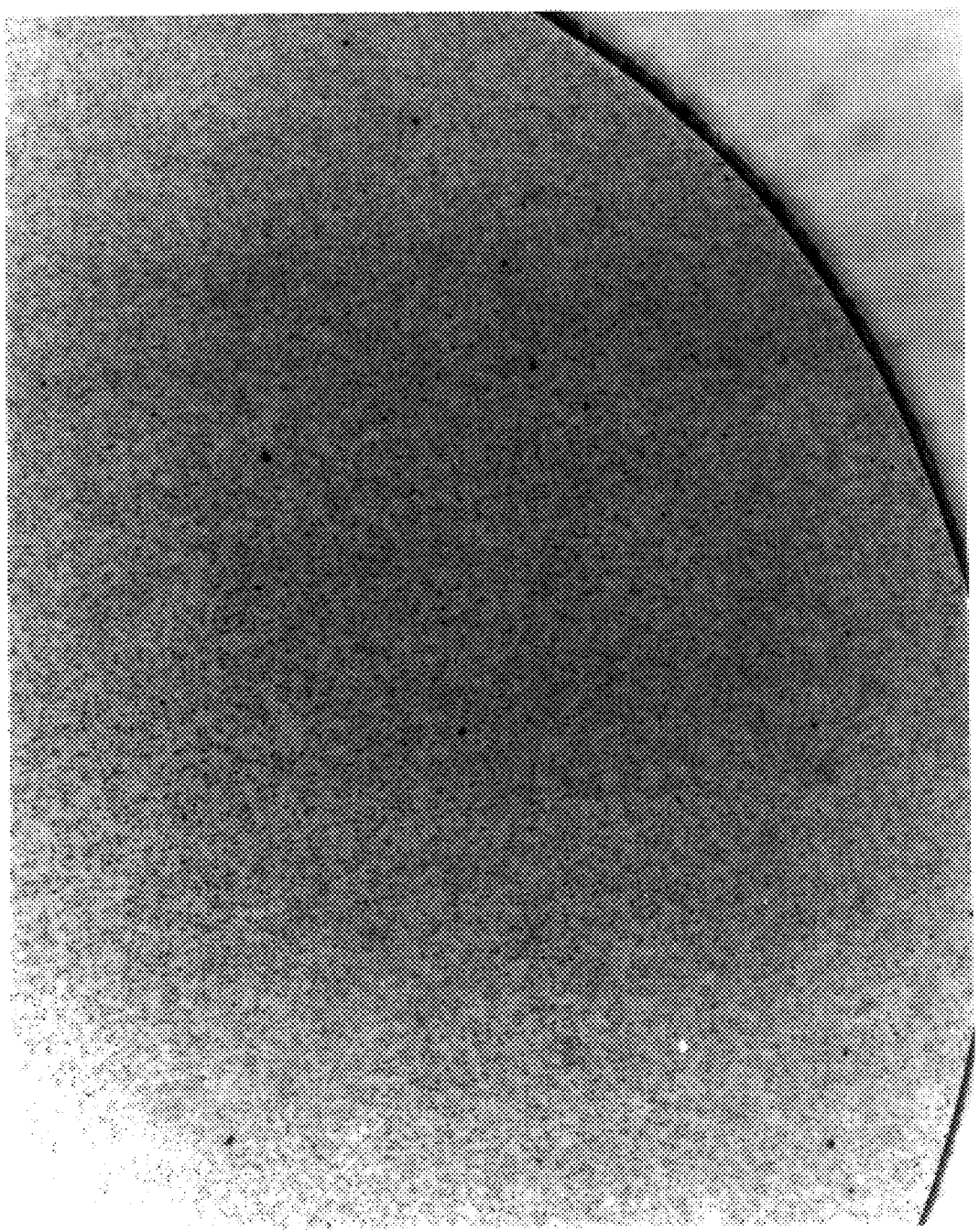
FIG. 4 is a transmission electron microscopy photomicrograph of the cross-section of a comparative fiber (comparative example 7) showing a continuous polypropylene polymer phase and discontinuous ethylene polymer (stained dark dispersed particles) phase.
Figure 5:
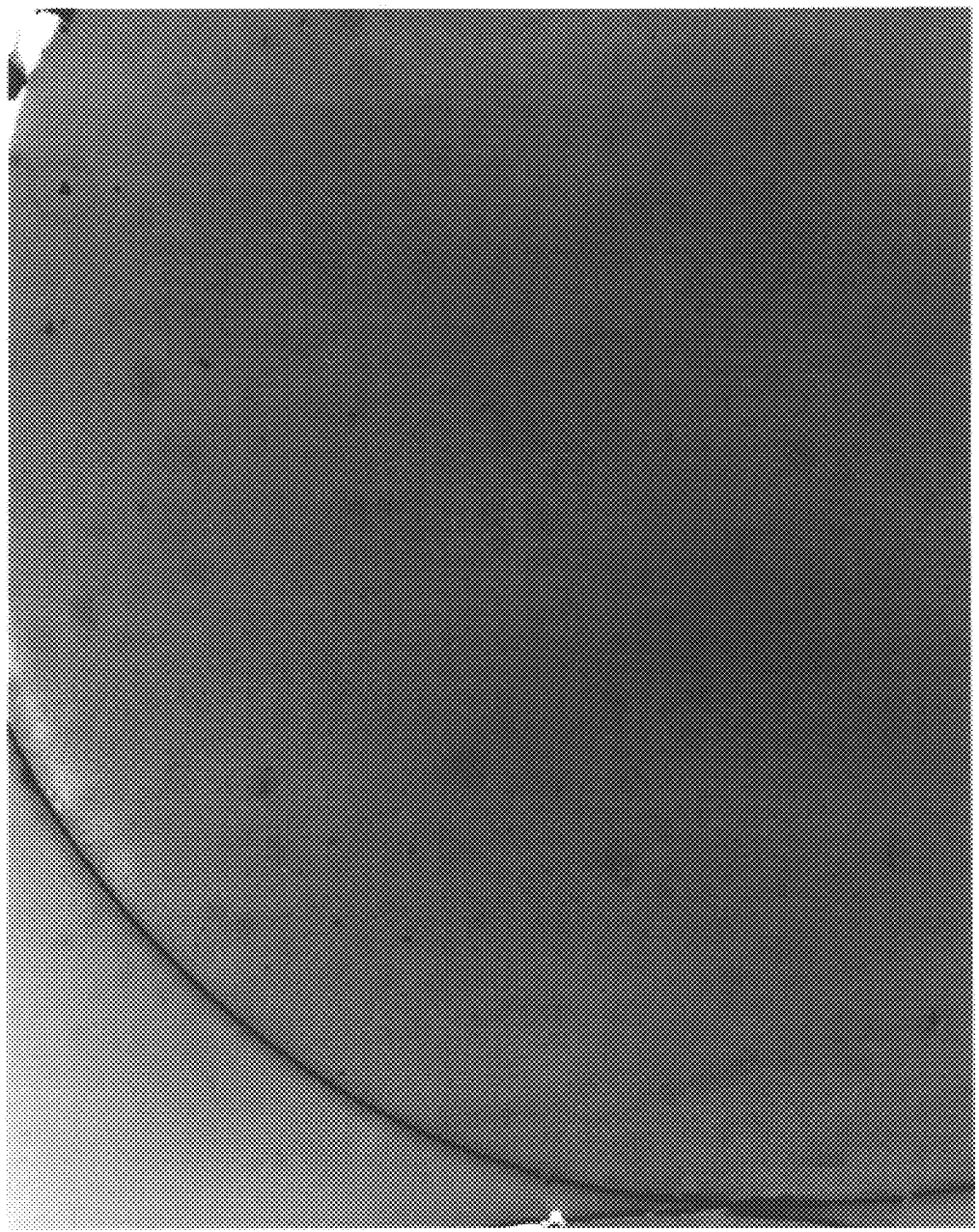
FIG. 5 is a transmission electron microscopy (TEM) photomicrograph of the cross-section of a comparative fiber (comparative example 12) showing a continuous polypropylene polymer phase and discontinuous ethylene polymer (highly dispersed stained dark particles) phase.
Figure 6:
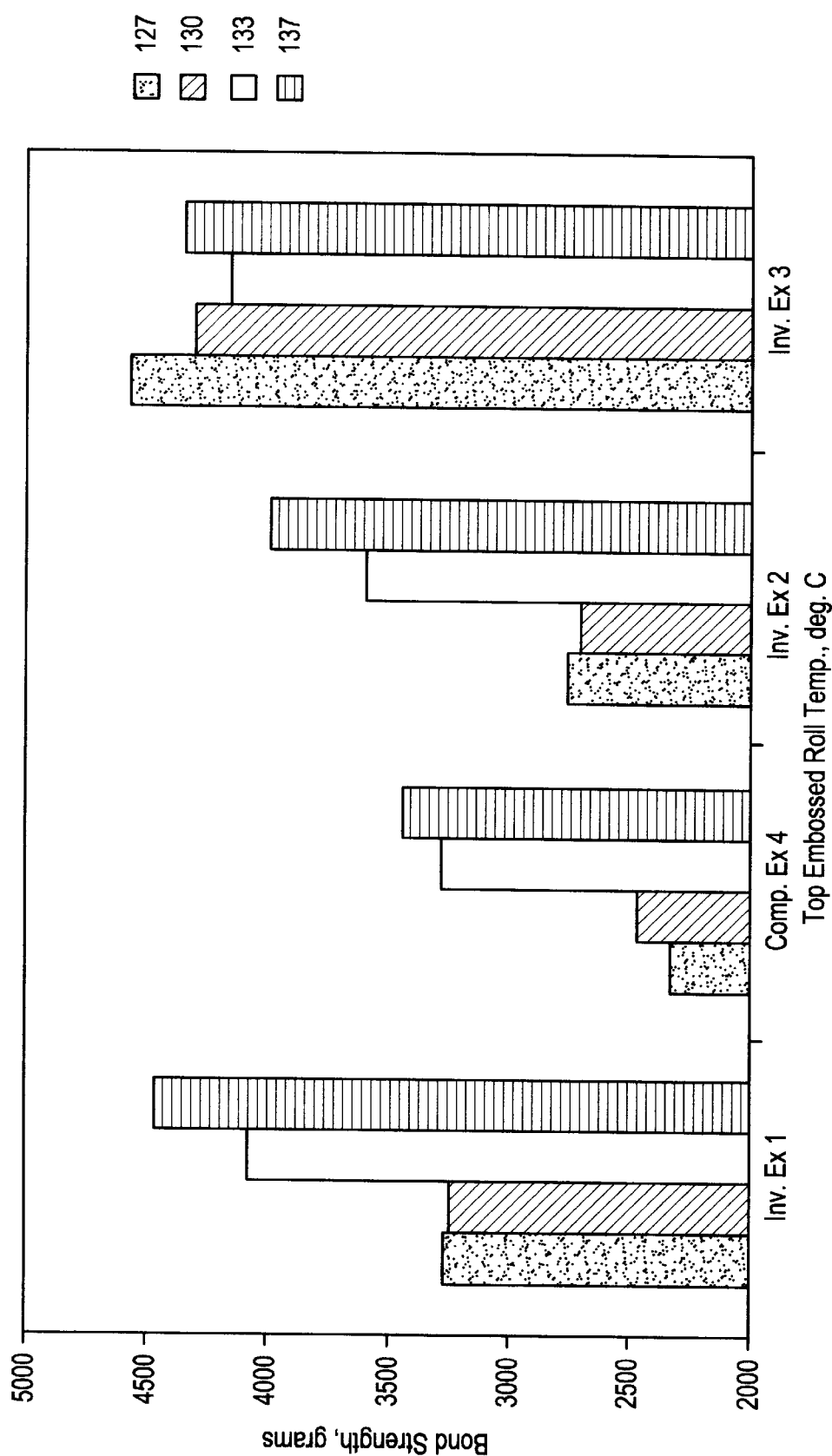
FIG. 6 is a bar chart illustrating the fabric thermal bond strength of Inventive Examples 1-3 and comparative example 4.
Figure 7:
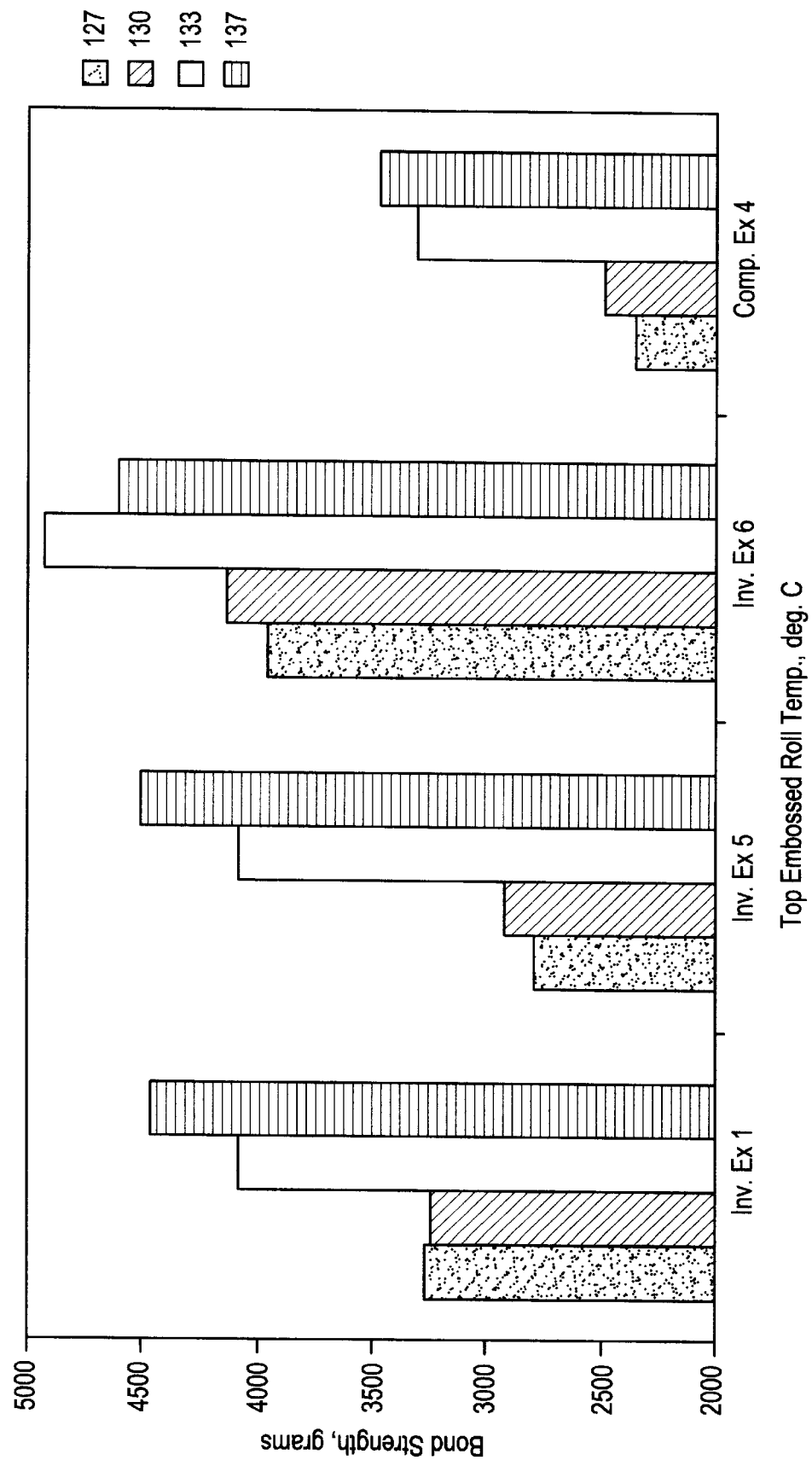
FIG. 7 is a bar chart illustrating the fabric thermal bond strength of Inventive Examples 1, 5 and 6 and comparative example 4.
Figure 8:
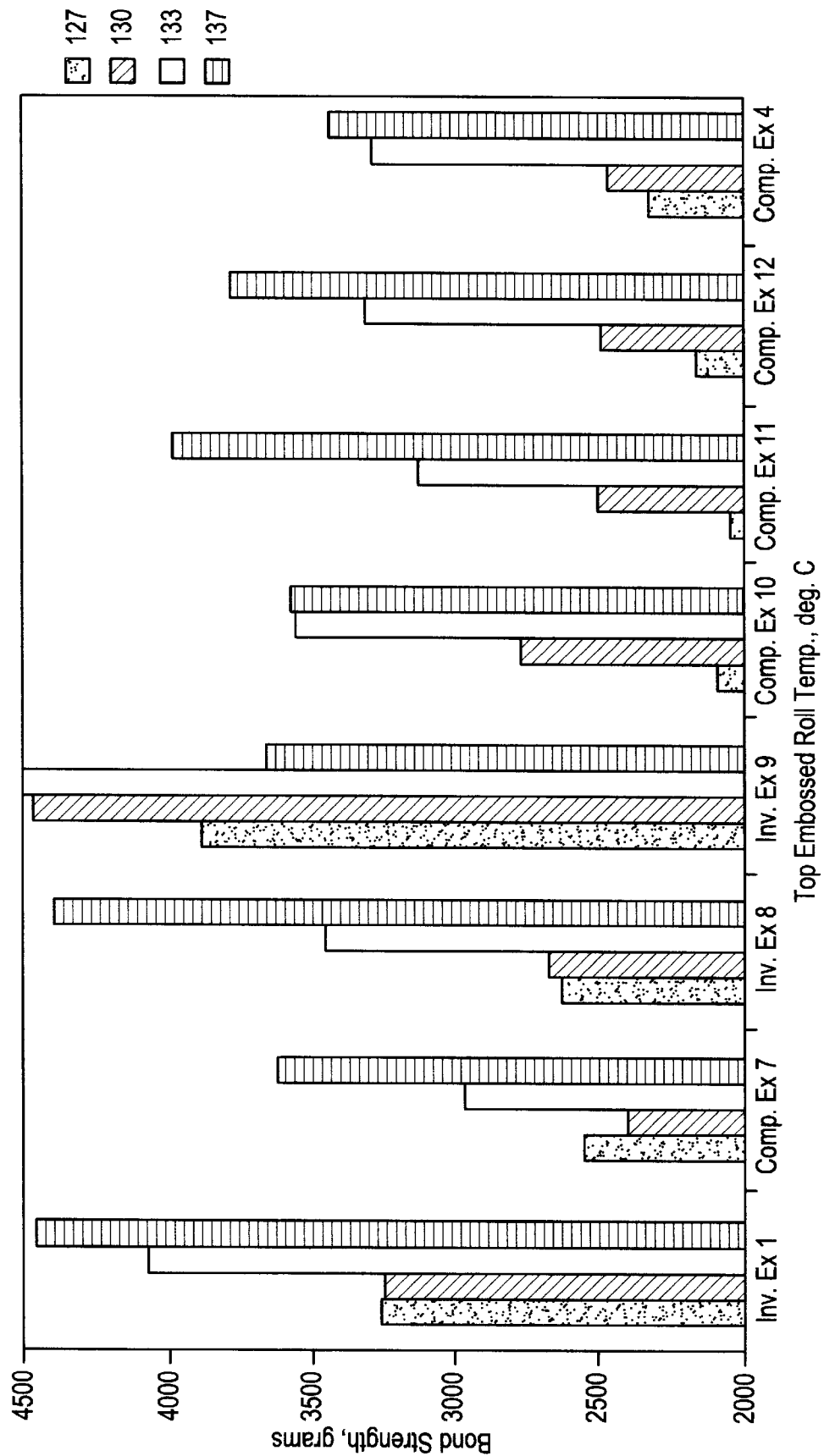
FIG. 8 is a bar chart illustrating the fabric thermal bond strength of Inventive Examples 1, 8, and 9 and comparative examples 4, 7, 10, 11 and 12.
Figure 9:
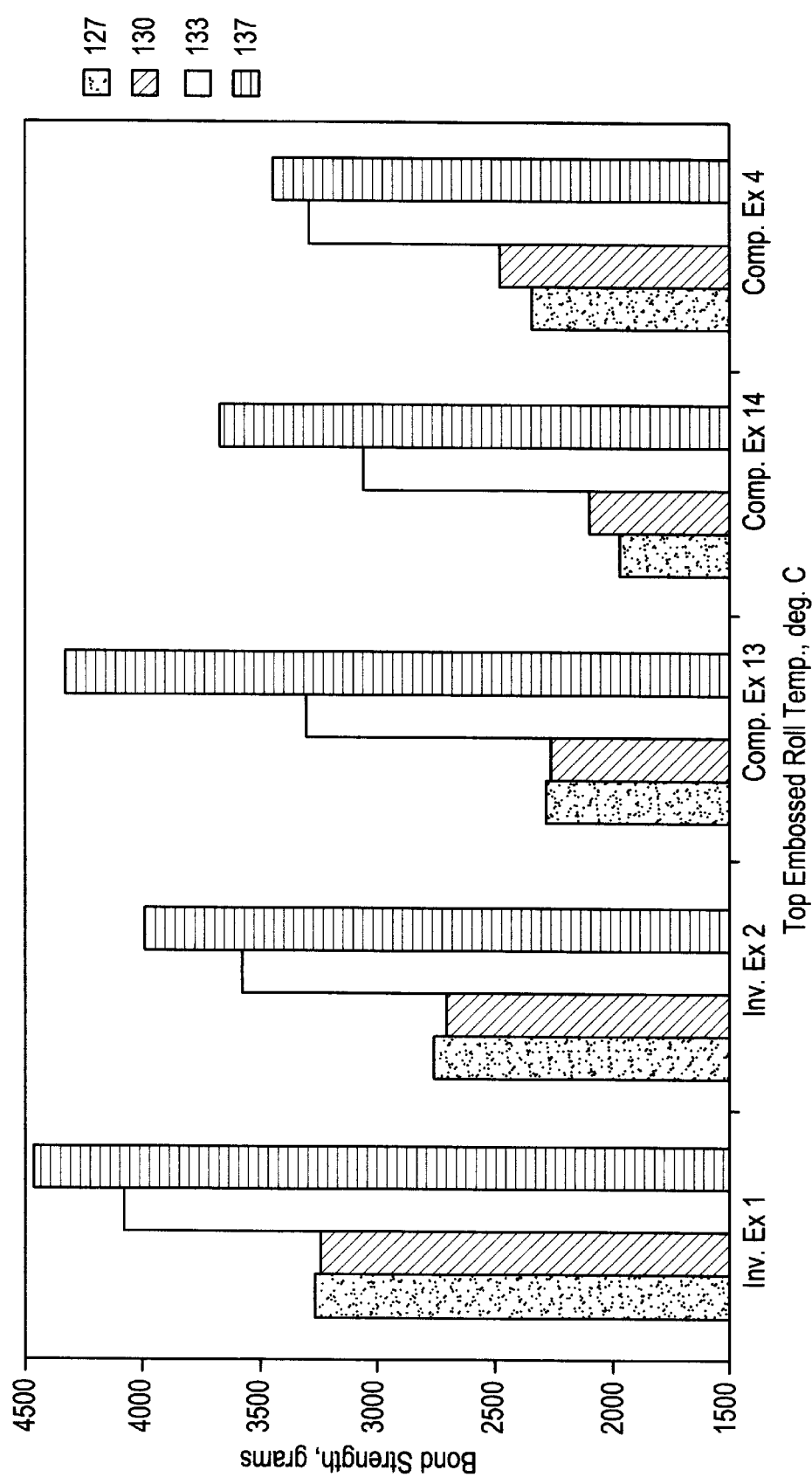
FIG. 9 is a bar chart illustrating the fabric thermal bond strength of Inventive Examples 1 and 2 and comparative examples 4, 13, and 14.
Figure 10:
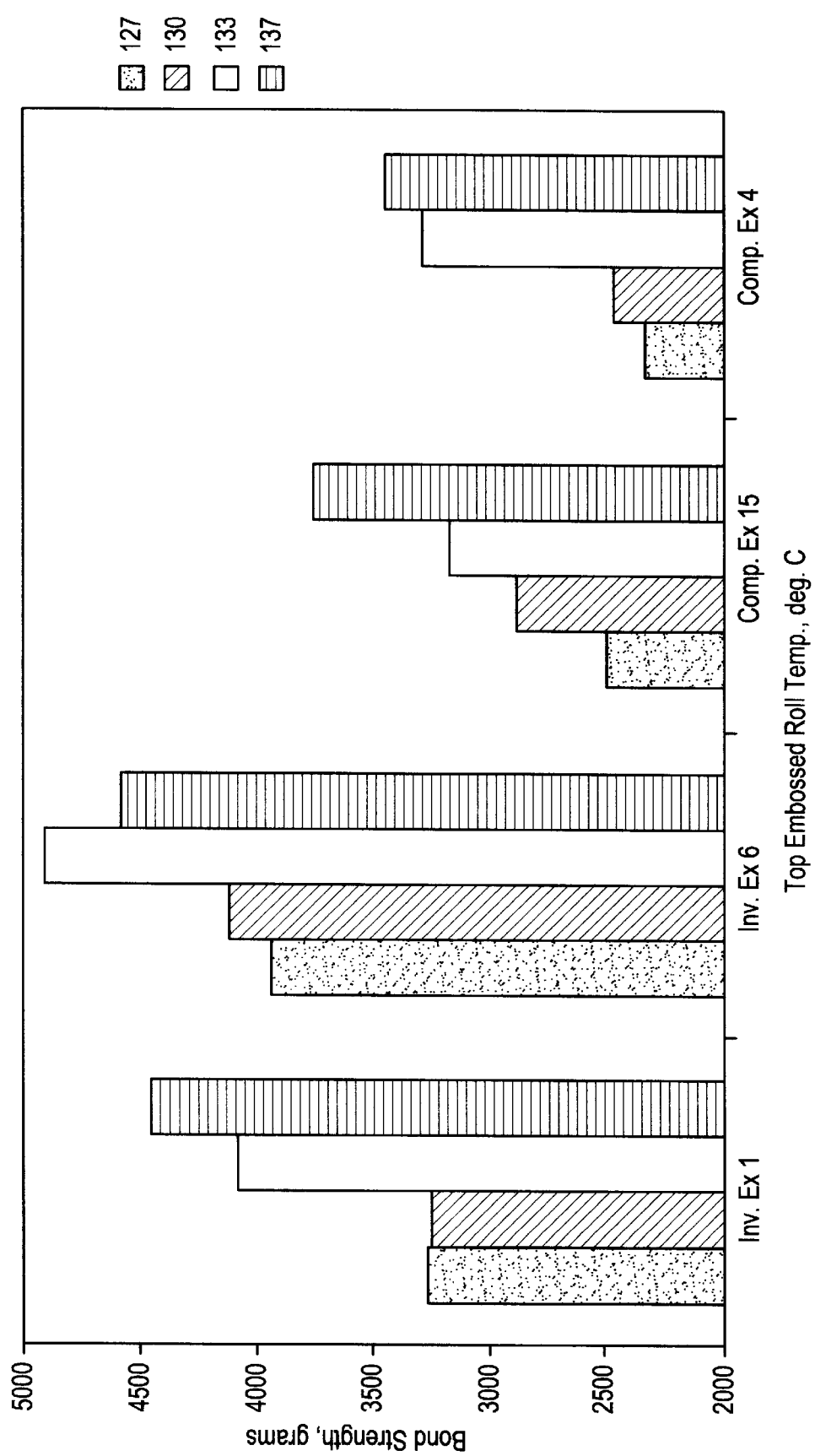
FIG. 10 is a bar chart illustrating the fabric thermal bond strength of Inventive Examples 1 and 6 and comparative examples 4 and 15.
Figure 11:
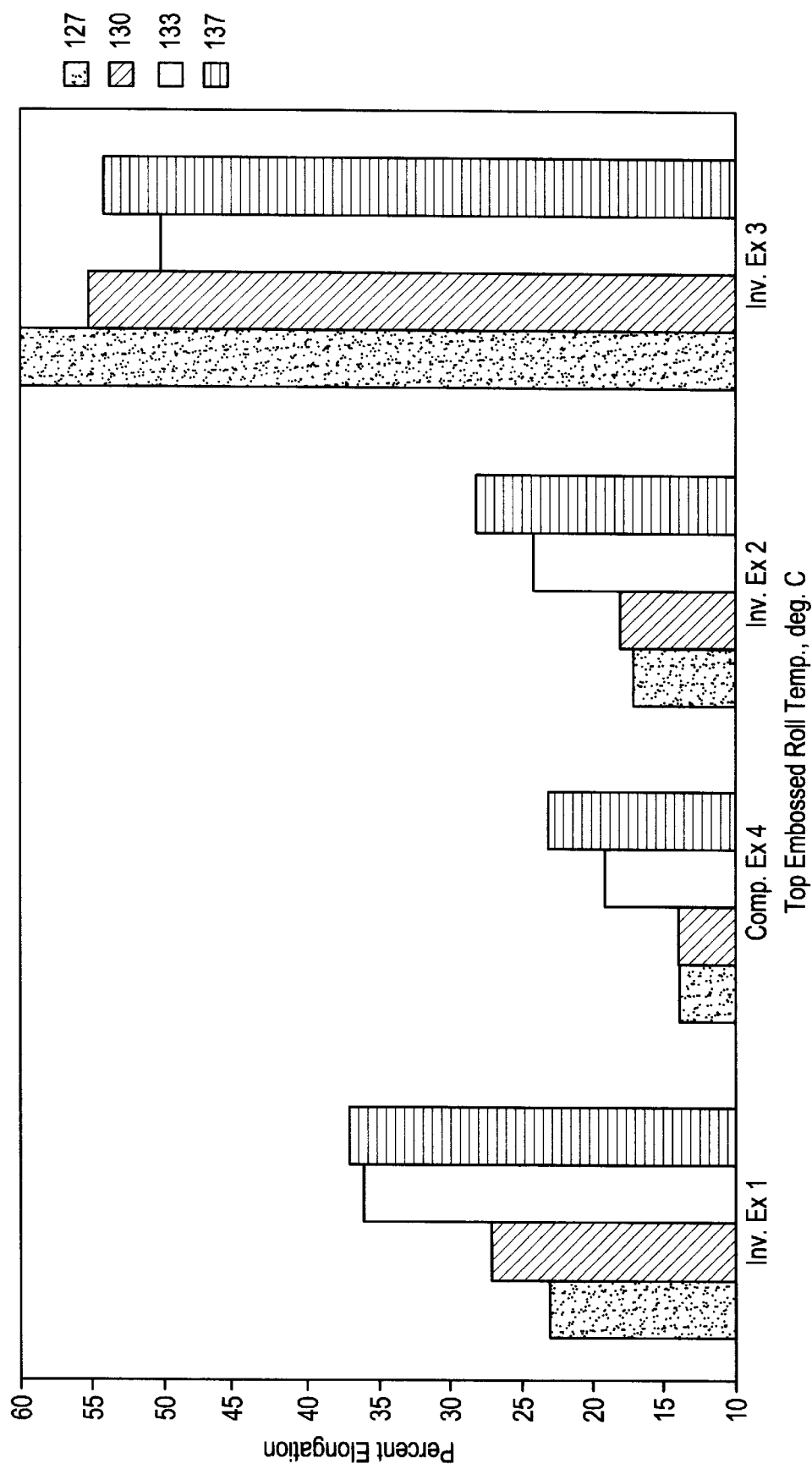
FIG. 11 is a bar chart illustrating the fabric thermal bond elongation of Inventive Examples 1–3 and comparative example 4.
Figure 12:
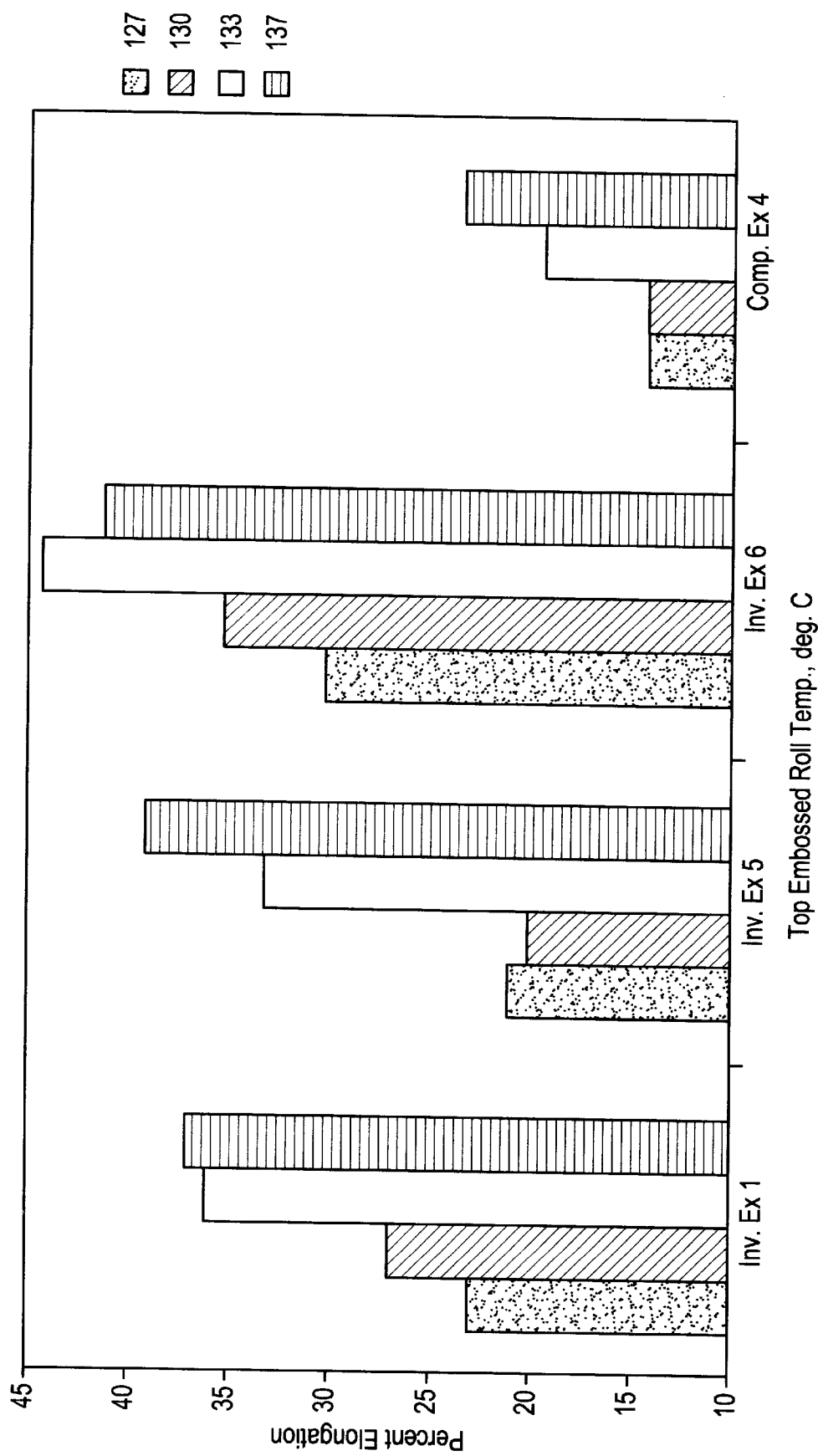
FIG. 12 is a bar chart illustrating the fabric thermal bond elongation of Inventive Examples 1, 5 and 6 and comparative example 4.
Figure 13:
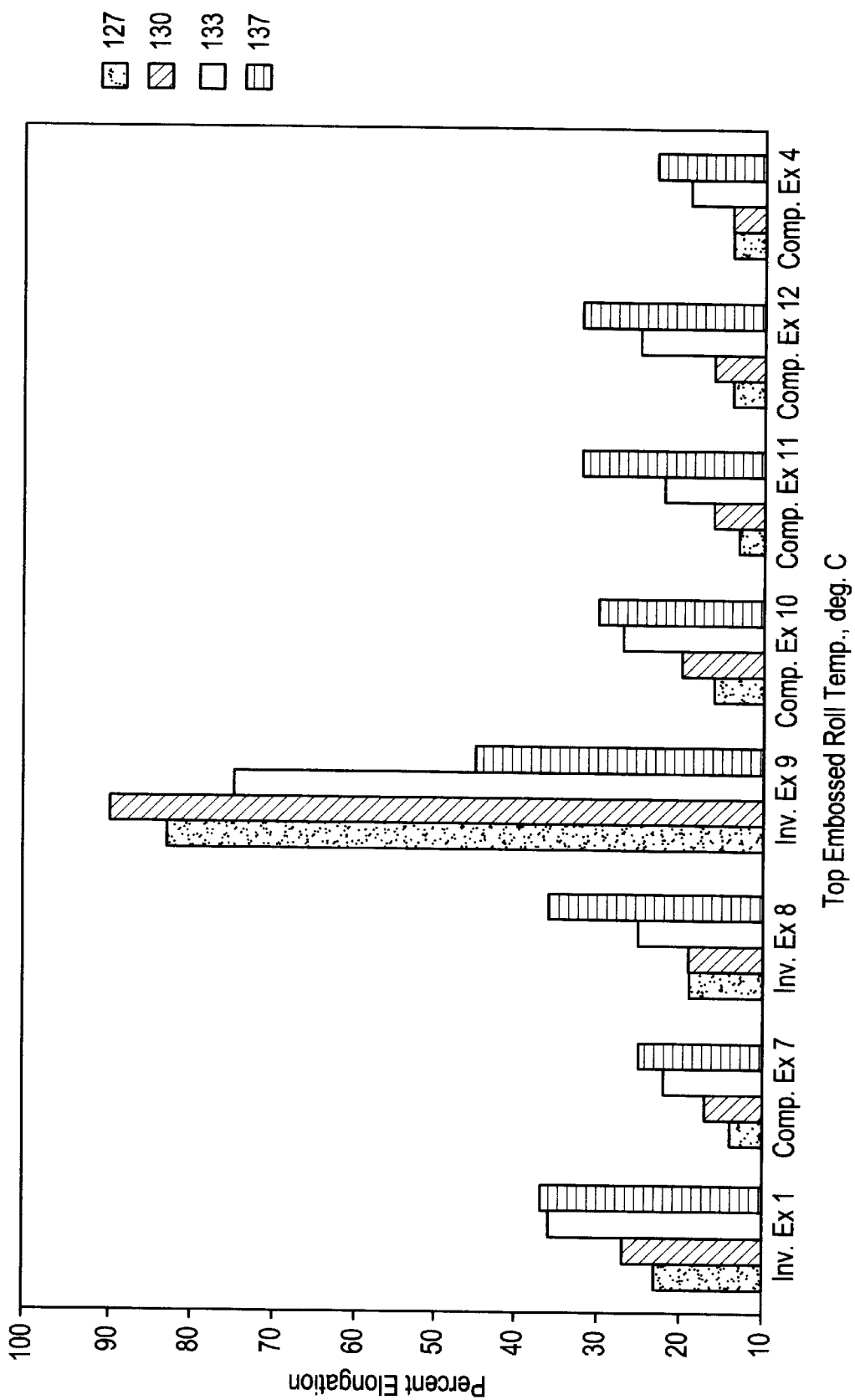
FIG. 13 is a bar chart illustrating the fabric thermal bond elongation of Inventive Examples 1, 8, and 9 and comparative examples 4, 7, 10, 11 and 12.
Figure 14:
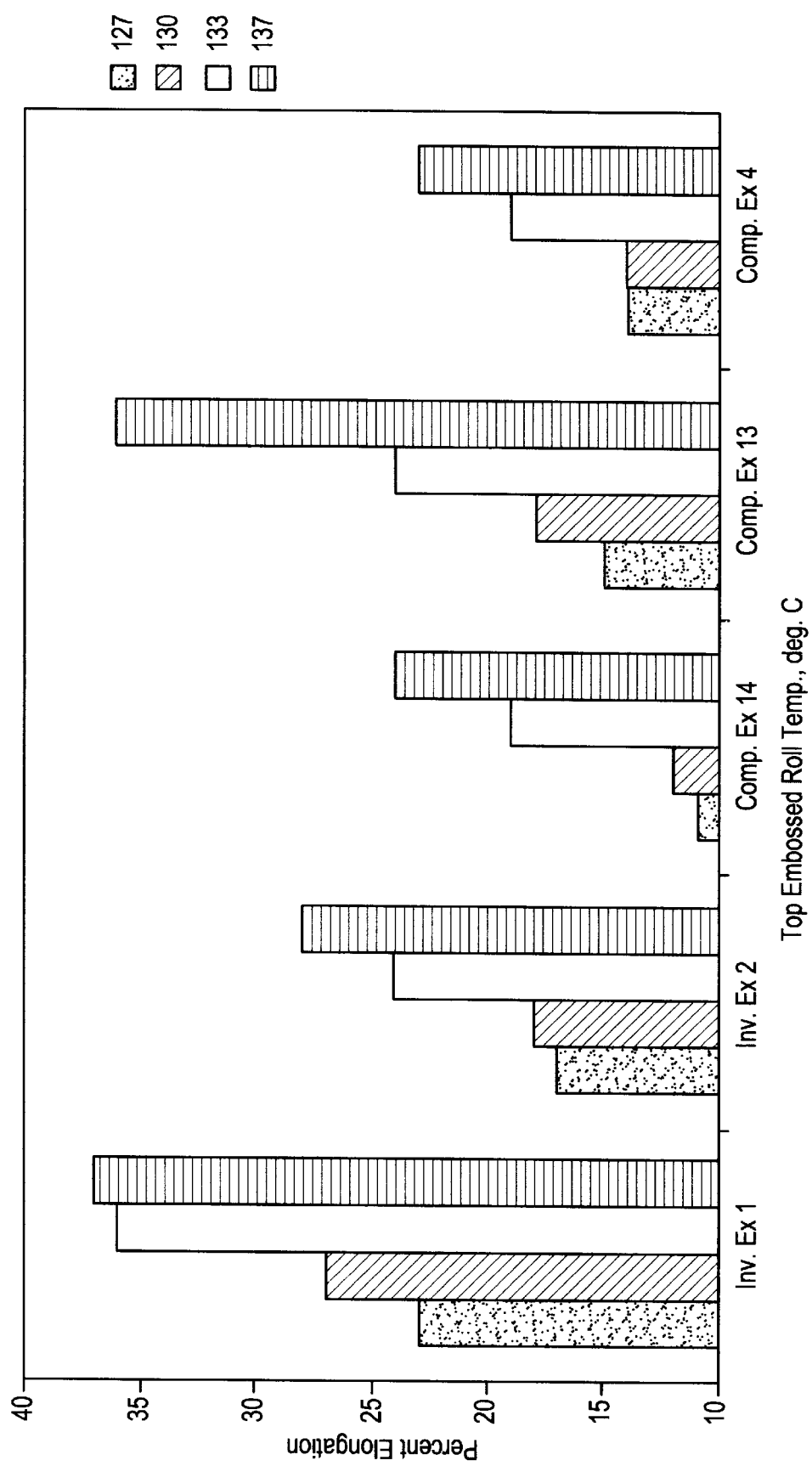
FIG. 14 is a bar chart illustrating the fabric thermal bond elongation of Inventive Examples 1 and 2 and comparative examples 4, 13, and 14.
Figure 15:
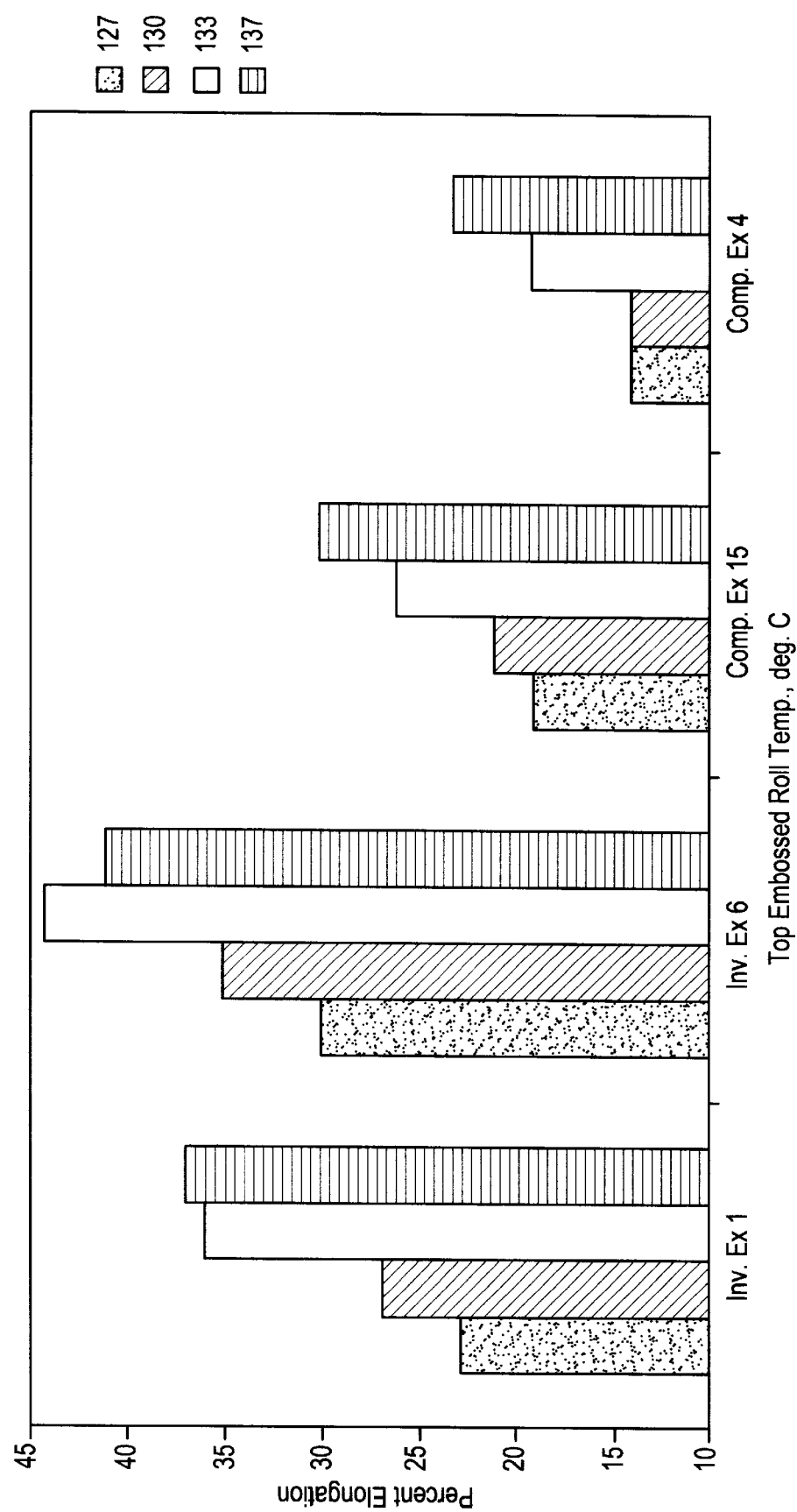
FIG. 15 is a bar chart illustrating the fabric thermal bond elongation of Inventive Examples I and 6 and comparative examples 4 and 15.

A photomicrograph of the cross-section of carded staple fibers of Inventive Example 1 was taken (FIG. 1). Prior to taking the photomicrograph, the carded staple fibers were stained with $RuCl_3$/hypochlorite and mounted with Epofix™. The photomicrograph itself shows, prior to thermal bonding, the cross-sectional configuration of the polypropylene polymer (continuous polymer phase) and the ethylene polymer (the discontinuous phase) is of the island-sea type with the polypropylene polymer constituting more than 50 percent of the surface of the carded staple fiber. That is, the discontinuous phase did not occupy a substantial portion of the fiber surface prior to thermal bonding. The same result and characteristic is shown in FIGS. 2 and 3 for Inventive Examples 3 and 9, respectively. In addition to indicating the discontinuous phase is distinct, not highly dispersed (relatively larger particles) and occupies about as much of the surface of the fiber as the weight percent amount contained therein (i.e., there is no preferential migration or substantially higher concentration at the surface), FIG. 3 also shows that the discontinuous substantially random ESI phase has at least two components. This multi-component discontinuous phase is shown as substantially circular particles with dark stained peripheries which may relate to the amount of atactic polymer present in the interpolymer. In contrast to FIGS. 1–3, FIG. 4 and FIG. 5 indicate that comparative examples are characterized by a substantially higher degree of dispersion (smaller discontinuous phase particles) and miscibility between the phases (less discontinuous phase distinctiveness). FIGS. 1–5 were all taken at 15,000× magnification.

The carded staple fibers of each example composition were bonded using a two-roll thermal bonding unit (that is, a Beloit Wheeler Model 700 Laboratory Calendar). The top roll had a 5 inch diameter and a 12 inch face and consisted of hardened chromed steel embossed in a square pattern at 20 percent coverage. The bottom roll was the same, except not embossed. For thermal bonding, the bond rolls were set at 1000 psi, which was equivalent to 340 pounds per linear inch (pli) for this unit. The conversion calculation was as follows: 1000 psi–400 psi for lower roll to overcome spring force=600 psi×1.988 square inch cylinder area/3.5 inches web width=340 pli.

The temperatures of the bond rolls were set to maintain about a 3° C. differential, with the top roll always being cooler to minimize sticking. The bond rolls were also set to range in temperature from about 118° C. to about 137° C. (top roll temperature) and 115° C. to 134° C. (bottom roll temperature). The rolls were rotated at 23.6 feet/minutes. The fiber webs were then passed between the two rolls and removed from the side opposite the feed area. The resultant nonwoven embossed fabrics which had a nominal weight basis of 1 ounce per square yard were then cut into 1 inch×4 inches fabric specimens.

Before performance testing, each fabric specimen was weighed and the weight entered into a computer program. The 1 inch×4 inches specimens were positioned lengthwise on a Sintech 10D tensiometer equipped with a 200 pound load cell, such that 1 inch at each end of the specimen was clamped in the top and bottom grips. The specimens were then pulled, one at a time, at 5 inches/minutes to their breaking point. The computer then used the dimensions of the specimen and the force exerted to calculate the percent strain (elongation) experienced by the specimen and the normalized force at break (tensile break which was taken as the bond strength for the example) in grams. Four measurements were taken at each bonding temperature for each example. Table 3 provides the thermal bonding bond strength performance results for the various carded staple fabric examples. Table 4 provides the thermal bonding elongation performance results for the various carded staple fabric examples. FIGS. 6–15 provide various comparisons between Inventive Examples 1, 2, 3, 5, 6, 8 and 9 and comparative examples 4, 5, 7, 10, 11, 12, 13, 14 and 15.

TABLE 3

| Top Roll, embossed, Temp., ° C. | Bond Strength, grams | | | | | | |
|---|---|---|---|---|---|---|---|
| | 118 | 120 | 123 | 127 | 130 | 133 | 137 |
| Inv. Ex 1 | ND | ND | 2769 | 3272 | 3251 | 4075 | 4457 |
| Inv. Ex 2 | 1842 | 1928 | 2150 | 2756 | 2704 | 3578 | 3975 |
| Inv. Ex 3 | 3509 | 4039 | 4337 | 4551 | 4289 | 4133 | 4329 |
| Comp. Ex 4 | 1843 | 2028 | 1831 | 2332 | 2464 | 3278 | 3431 |
| Inv. Ex 5 | 2051 | 2100 | 3387 | 2784 | 2909 | 4080 | 4491 |
| Inv. Ex 6 | 3240 | 3367 | 3558 | 3936 | 4110 | 4897 | 4574 |
| Comp. Ex 7 | 1781 | 1809 | 2171 | 2545 | 2403 | 2965 | 3610 |
| Inv. Ex 8 | 1992 | 2129 | 2009 | 2626 | 2672 | 3454 | 4389 |
| Inv. Ex 9 | 3029 | 3307 | 3344 | 3886 | 4468 | 4497 | 3646 |
| Comp. Ex 10 | 1780 | 1774 | 1819 | 2092 | 2764 | 3542 | 3560 |
| Comp. Ex 11 | 1651 | 1625 | 1695 | 2043 | 2507 | 3125 | 3970 |
| Comp. Ex 12 | 1692 | 1738 | 1961 | 2161 | 2488 | 3301 | 3772 |
| Comp. Ex 13 | 2095 | 2054 | 2037 | 2275 | 2251 | 3295 | 4311 |
| Comp. Ex 14 | 1528 | 1630 | 2146 | 1965 | 2083 | 3047 | 3659 |
| Comp. Ex 15 | 1914 | 2198 | 2111 | 2493 | 2882 | 3167 | 3745 |

Table 3 and FIGS. 6–10 show all Inventive Examples, at a top embossed roll temperature of 127–130° C., are generally characterized as having bond strengths greater than or equal 2,500 grams and Inventive Examples 1, 3, 6 and 9 are preferentially characterized as having dramatically improved bond strengths at greater than or equal to 3,250 gram. That is, bond strengths of Inventive Examples 1, 3, 6 and 9 were greater than 36 percent higher (and up to 84 percent) higher than the bond strength of the polypropylene polymer at a top embossed roll temperature of 127–130° C.

Table 3 and FIGS. 6–10 also show where the $I_2$ melt index of the ethylene polymer is relatively high (that is, greater than or equal to 5 g/10 minutes) and the ethylene polymer is an ethylene/□-olefin interpolymer (for example, where the α-olefin is 1-hexene, 1-butene or 1-octene), the inventive composition will be characterized as comprising an ethylene polymer which has a polymer density greater than 0.87 g/cm³, preferably greater than or equal 0.90 g/cm³, and more preferably greater than or equal to 0.94 g/cm³.

TABLE 4

Percent Elongation

| Top Roll, embossed, Temp., °C. | 118 | 120 | 123 | 127 | 130 | 133 | 137 |
|---|---|---|---|---|---|---|---|
| Inv. Ex 1 | ND | ND | 20 | 23 | 27 | 36 | 37 |
| Inv. Ex 2 | 11 | 12 | 12 | 17 | 18 | 24 | 28 |
| Inv. Ex 3 | 42 | 56 | 53 | 60 | 55 | 50 | 54 |
| Comp. Ex 4 | 11 | 11 | 12 | 14 | 14 | 19 | 23 |
| Inv. Ex 5 | 13 | 12 | 18 | 21 | 20 | 33 | 39 |
| Inv. Ex 6 | 24 | 27 | 27 | 30 | 35 | 44 | 41 |
| Comp. Ex 7 | 11 | 12 | 13 | 14 | 17 | 22 | 25 |
| Inv. Ex 8 | 15 | 15 | 13 | 19 | 19 | 25 | 36 |
| Inv. Ex 9 | 55 | 66 | 106 | 127 | 107 | 105 | 60 |
| Inv. Ex 10 | 69 | 73 | 69 | 83 | 90 | 75 | 45 |
| Comp. Ex 11 | 13 | 14 | 14 | 16 | 20 | 27 | 30 |
| Comp. Ex 12 | 11 | 11 | 11 | 13 | 16 | 22 | 32 |
| Comp. Ex 13 | 11 | 11 | 12 | 14 | 16 | 25 | 32 |
| Comp. Ex 14 | 15 | 14 | 14 | 15 | 18 | 24 | 36 |
| Comp. Ex 15 | 9 | 10 | 11 | 11 | 12 | 19 | 24 |
| Comp. Ex 16 | 16 | 16 | 18 | 19 | 21 | 26 | 30 |

Further, Table 3 and FIGS. 6–10 also show that in addition to ethylene/α-olefin interpolymers (Inventive Examples 1, 3 and 6), other high molecular weight ethylene polymers such as high molecular weight ethylene/styrene interpolymers (Inventive Example 9) can dramatically improve the fiber bond strength of isotactic polypropylene polymers. This data also suggests that the same result can be obtained with high molecular weight ethylene homopolymers (HMW-HDPE).

FIGS. 11–15 and Table 4 show that in addition to improved bond strength, the inventive composition also provides improved fiber elongation; that is, at a thermal bonding temperature of 127–130° C., all inventive compositions had elongations greater than 15 percent and preferred inventive compositions (Inventive Examples 3, 6 and 9) had elongations greater than or equal to 30 percent at a thermal bonding temperature of 127–130° C. This result is surprising and unexpected because bond strength improvements tend to reduce elongation performance (and vice versa). For example, comparative example 10 had a lower bond strength at 127° C. than the polypropylene polymer while this comparative example also had a higher percent elongation than the polypropylene polymer at 127° C.

In another evaluation, the effect of blending a minor amount of a high molecular weight ethylene polymer in a Ziegler-catalyzed polypropylene polymer and a metallocene-catalyzed polypropylene polymer was investigated. The Ziegler-catalyzed polypropylene polymer and the high molecular weight ethylene polymer (EP2) were the same as used in Inventive Example 5 above. The reactor grade metallocene-catalyzed polypropylene polymer in the evaluation had a MFR of 22 g/10 minutes melt flow rate (ASTM D-1238, Condition 230° C./2.16 kg) and was sold under the designation of ACHIEVE 3904 by Exxon Chemical Corporation.

Figure 16:
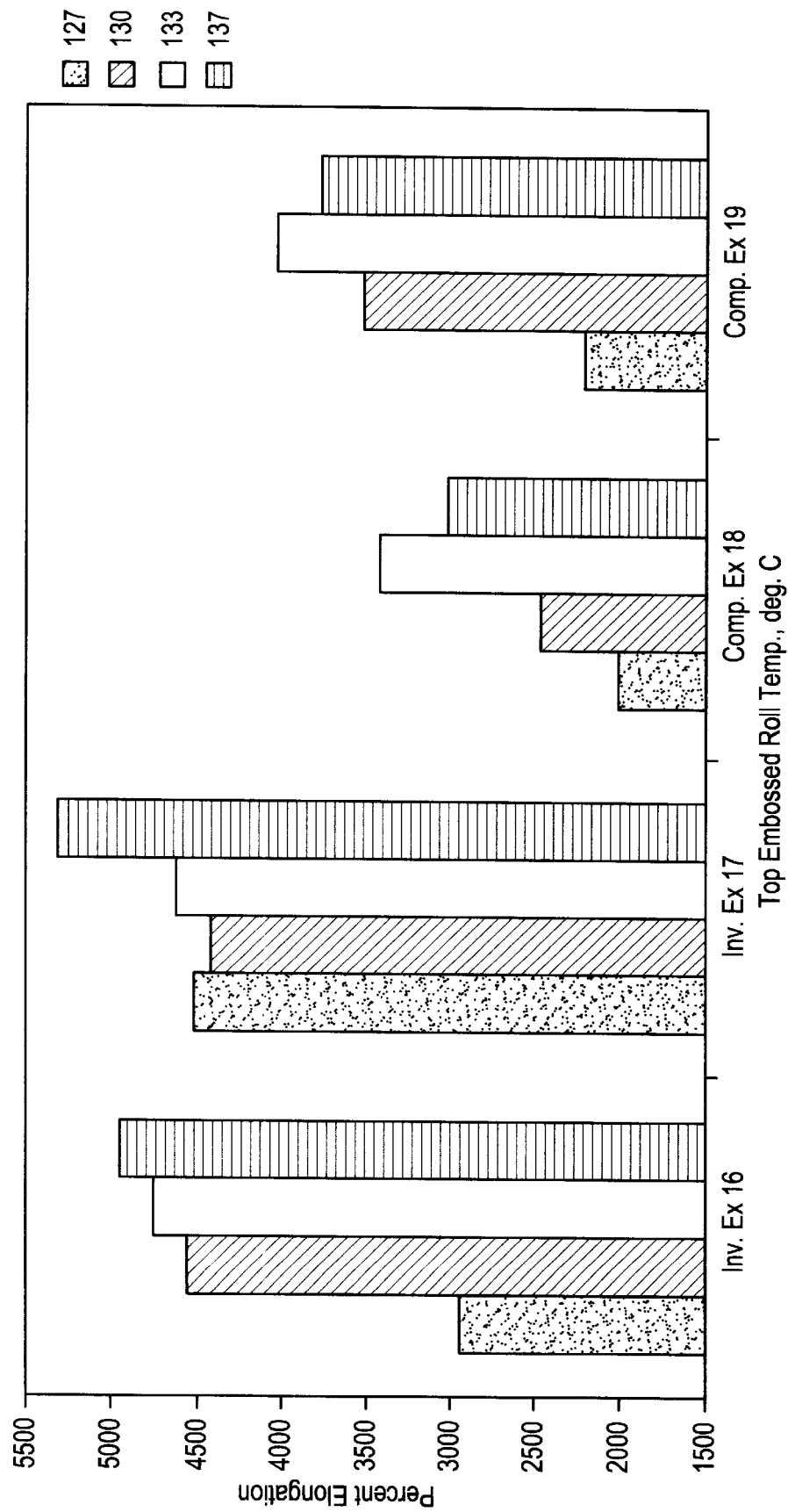
FIG. 16 is a bar chart illustrating the fabric thermal bond strength of Inventive Examples 16 and 17 and comparative examples 18 and 19.
Figure 17A:
FIGS. 17a–d are lighted microscope photomicrographs of thermally bonded inventive fibers (Inventive Example 1) and comparative fibers (comparative example 4) at 25× and 200× magnification.
Figure 17B:
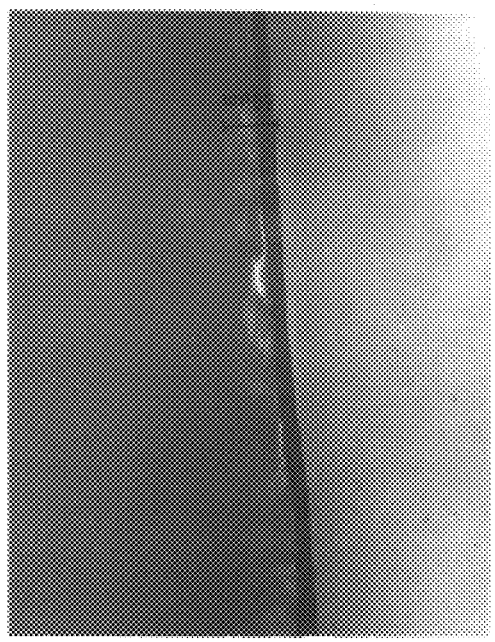
Figure 17C:
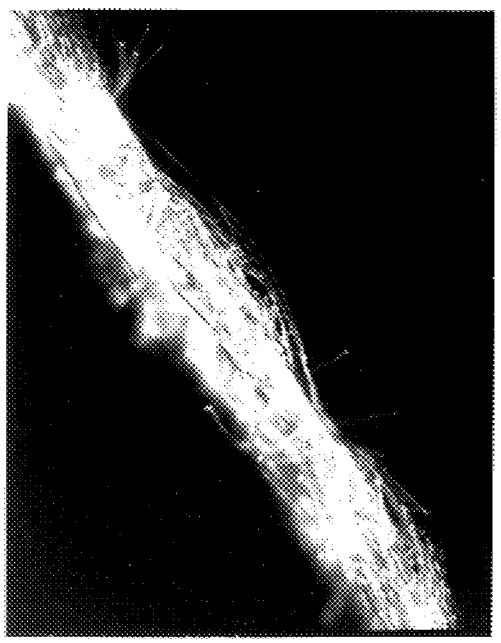
Figure 17D:
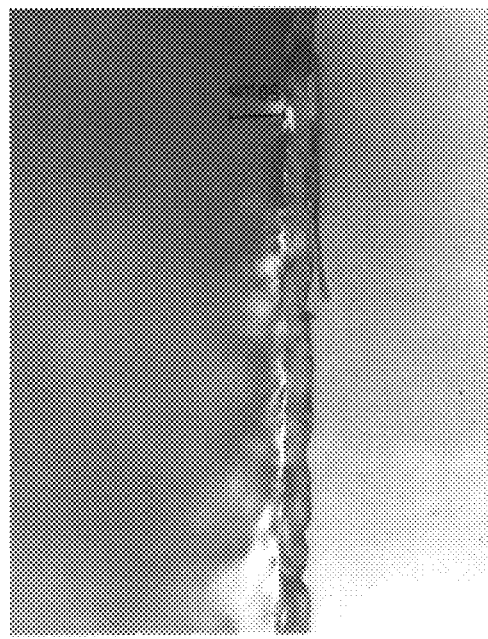
Figure 18A:
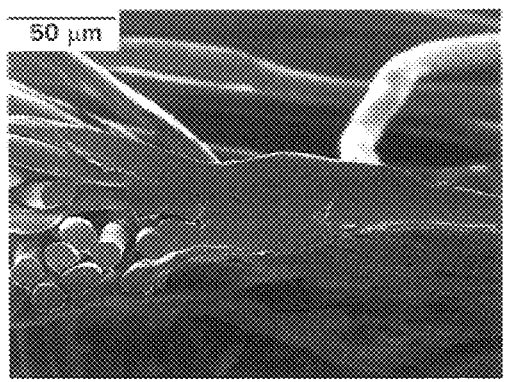
FIGS. 18a–d are lighted microscope photomicrographs of thermally bonded inventive fibers (Inventive Example 1) and comparative fibers (comparative example 4) at 50 μm and 20 μm magnification.
Figure 18B:
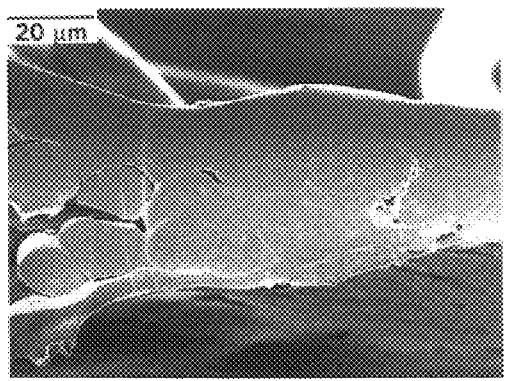
Figure 18C:
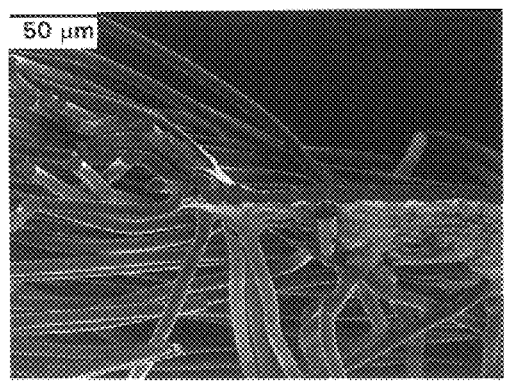
Figure 18D:
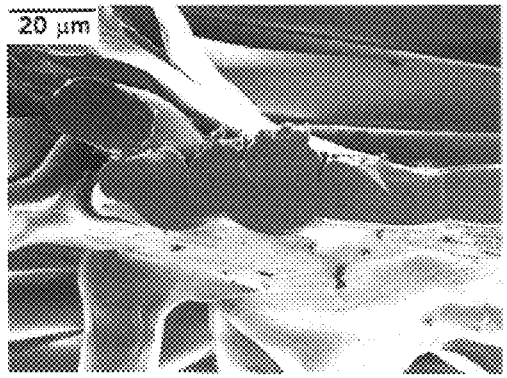

This evaluation consisted of four different polymer compositions; each polypropylene polymer was evaluated as a control resin and for the other two examples, each polypropylene polymer was melt blended/extruded with 1000 ppm Irgafos 168 and 5 weight percent of ENGAGE Elastomer 8100 (an ethylene/1-octene interpolymer supplied by Dupont-Dow Elastomers) using the above-described master batch concentrate and ZSK-30 extruder at about 190° C. Each control propylene polymer was also melt blended/extruded with 1000 ppm Irgafos 168 using the above-described master batch concentrate and the ZSK-30 extruder at about 190° C. The polypropylene polymer/ethylene polymer blend that comprised the Ziegler-catalyzed polypropylene polymer was designated Inventive Example 16. The polypropylene polymer/ethylene polymer blend that comprised the metallocene-catalyzed polypropylene polymer was designated Inventive Example 17. The Ziegler-catalyzed polypropylene polymer was designated comparative example 18 and the ACHIEVE 3904 metallocene-catalyzed polypropylene polymer was designated comparative example 19. Each polymer composition was spun into fine denier staple fibers as described above for Inventive Example 1 and was also carded as described above. The carded staple fibers for were tested for bond performance using the same methods and procedures described above for Inventive Example 1. FIG. 16 graphically shows the thermal bonding performance results for the four example compositions. The results in FIG. 12 indicate that a high weight ethylene polymer at nominal amounts can dramatically improve the thermal bonding performance of both isotactic and metallocene-polypropylene polymers and that improvements are especially substantial and surprising stable across a broad bond temperature range with the meallocene-polypropylene polymer.

Figure 19:
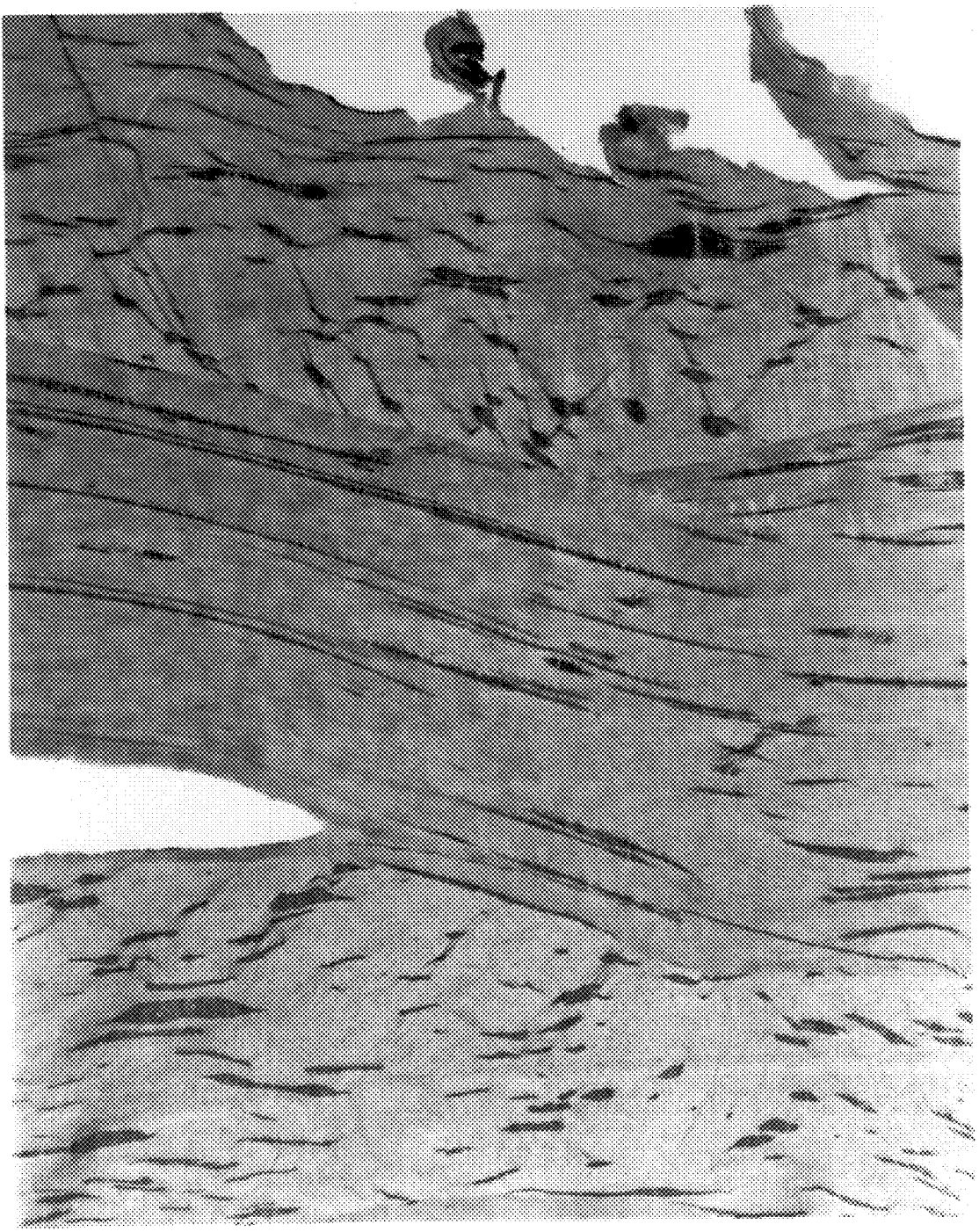
FIG. 19 is a transmission electron microscopy (TEM) photomicrograph at 15,000× magnification of the bond cross-section of thermally bonded inventive fibers (Inventive Example 1) showing a continuous polypropylene polymer phase and a discontinuous ethylene polymer (stained dark) phase.
Figure 20:
FIG. 20 is a transmission electron microscopy (TEM) photomicrograph at 15,000× magnification of the bond cross-section of several thermally bonded comparative fibers (comparative example 4) showing stress crazing (stained dark) within the continuous polypropylene polymer matrix.

FIGS. 17–20 are photomicrograph of thermally bonded fibers. FIG. 17 shows that very little shrink or stress is associated with the inventive fiber (FIG. 17(b)) relative to the comparative fiber (FIG. 17(d)). FIG. 18 shows that substantially more melting and flowing is associated with the inventive fiber (FIGS. 18(a) and (b)) relative to the comparative fiber (FIGS. 18(c) and (d)). FIG. 19 shows at least four different inventive fibers at different viewing perspectives at a thermal bonded site magnified 15,000×. The different perspectives show, for the inventive fiber (Inventive Example 1), the discontinuous ethylene polymer phase (dark stained areas) does not occupy a substantial portion of a respective fiber surface after thermal bonding. At 15,000× magnification, FIG. 20 shows there is some crazing associated with polypropylene polymers.

In another evaluation to investigate thermal bonding performance, a minor amount of various high molecular weight ethylene polymers were separately blended with a visbroken Ziegler-catalyzed polypropylene polymer and compared to the neat visbroken Ziegler-catalyzed polypropylene polymer, a neat reactor grade metallocene-catalyzed polypropylene polymer and a neat reactor grade Ziegler-catalyzed polypropylene polymer. The visbroken Ziegler-catalyzed polypropylene polymer (comparative example 18) was the same as used in Inventive Example 1 above. The reactor grade metallocene-catalyzed polypropylene polymer (comparative example 19) was the same above; that is, it had a MFR of 22 g/10 minutes melt flow rate (ASTM D-1238, Condition 230° C./2.16 kg) and was sold under the designation of ACHIEVE 3904 by Exxon Chemical Corporation. The reactor grade Ziegler-catalyzed polypropylene polymer (comparative example 20) had a MFR of 25 g/10 minutes melt flow rate (ASTM D-1238, Condition 230° C./2.16 kg).

The various high molecular weight ethylene polymers used in this evaluation are listed in Table 5 below.

TABLE 5

| Resin | Product Type/Designation | $I_2$, Melt Index, g/10 min. | Density, g/cm$^3$ |
|---|---|---|---|
| EP9 | HDPE 05862 | 5 | 0.962 |
| EP10 | SLEP | 0.7 | 0.960 |
| EP11 | ESI DE 100 | 0.5 | 30 wt. %‡ |

TABLE 5-continued

| Resin | Product Type/Designation | $I_2$, Melt Index, g/10 min. | Density, g/cm$^3$ |
|---|---|---|---|
| EP12 | ESI DS 100 | 0.5 | 70 wt. %‡ |
| EP13 | ENGAGE* 8180 | 0.5 | 0.863 |

‡Rather than density, the reported value is weight percent styrene.
Except for ENGAGE 8180, all of the above ethylene polymers are available from The Dow Chemical Company.
ESI denotes a substantially random ethylene/styrene interpolymer.
SLEP denotes a homogeneously branched substantially linear ethylene/1-octene interpolymer manufactured using a constrained geometry catalyst system in a continuous polymerization reaction system.
ENGAGE is a trademark of Dupont-Dow Elastomers for ethylene elastomers.
ENGAGE elastomers are manufactured in a continuous polymerization reaction system using a constrained geometry catalyst system.
HDPE 05862 manufactured using a Ziegler catalysis system.

Table 6 below provides the polymer weight percentage information for the examples investigated in this evaluation.

TABLE 6

| Example | Ethylene Polymer | Weight Percent Ethylene Polymer |
|---|---|---|
| Comp. Ex 21 | EP9 | 5 |
| Inv. Ex 22 | EP10 | 5 |
| Comp. Ex 23 | EP11 | 5 |
| Inv. Ex 24 | EP12 | 5 |
| Inv. Ex 25 | EP10/EP13 | 2.5/2.5 |
| Comp. Ex 26 | EP9 | 8 |

Each of the ethylene polymer/polypropylene polymer combinations were melt blended/extruded with 1000 ppm Irgafos 168 on a ZSK-30 twin-screw co-rotating extruder at about 190° C. Comparative example 18, a control propylene polymer, was also melt blended/extruded with 1000 ppm Irgafos 168 the ZSK-30 extruder at about 190° C.

Each polymer composition was spun into fine denier staple fibers as described above for Inventive Example 1 and was also carded as described above. The carded staple fibers for were tested for bond performance using the same methods and procedures described above for Inventive Example 1. Table 7 provides the thermal bonding bond strength (tenacity) performance results at 1 oz/yd$^2$ for the various carded staple fabric examples. Table 8 provides the thermal bonding elongation performance results at 1 oz/yd$^2$ for the various carded staple fabric examples.

TABLE 7

| | Bond Strength, grams | | | | | | |
|---|---|---|---|---|---|---|---|
| Top Roll, embossed, Temp., ° C. | 120 | 123 | 127 | 130 | 133 | 137 | 140 |
| Comp. Ex 18 | 1608 | 1553 | 1836 | 1813 | 2112 | 3165 | 3725 |
| Comp. Ex 19 | ND | 2080 | 1825 | 2288 | 2361 | 3263 | 3573 |
| Comp. Ex 20 | ND | 1816 | 1776 | 2024 | 2043 | 2559 | 2839 |
| Comp. Ex 21 | 1608 | 1643 | 2025 | 2001 | 2532 | 3113 | 3980 |
| Inv. Ex 22 | 2545 | 2709 | 3157 | 3872 | 4693 | 4872 | 4644 |
| Comp. Ex 23 | 1965 | 2237 | 2249 | 2479 | 2899 | 3452 | 4231 |
| Inv. Ex 24 | 2117 | 2521 | 2829 | 3100 | 3637 | 3836 | 5048 |
| Inv. Ex 25 | 2288 | 2792 | 3383 | 3851 | 4092 | 4780 | 4329 |
| Comp. Ex 26 | ND | 1817 | 2217 | 2492 | 2709 | 3312 | 4640 |

TABLE 8

| | Percent Elongation | | | | | | |
|---|---|---|---|---|---|---|---|
| Top Roll, embossed, Temp., ° C. | 120 | 123 | 127 | 130 | 133 | 137 | 140 |
| Comp. Ex 18 | 8 | 8 | 9 | 11 | 13 | 18 | 27 |
| Comp. Ex 19 | ND | 10 | 8 | 11 | 12 | 19 | 24 |
| Comp. Ex 20 | ND | 8 | 9 | 10 | 10 | 13 | 15 |
| Comp. Ex 21 | 9 | 9 | 11 | 14 | 17 | 23 | 37 |
| Inv. Ex 22 | 24 | 26 | 34 | 53 | 85 | 80 | 59 |
| Comp. Ex 23 | 12 | 14 | 13 | 18 | 22 | 27 | 38 |
| Inv. Ex 24 | 15 | 18 | 19 | 23 | 30 | 35 | 54 |
| Inv. Ex 25 | 24 | 30 | 40 | 55 | 70 | 80 | 52 |
| Comp. Ex 26 | ND | 10 | 12 | 15 | 18 | 23 | 40 |

Table 7 shows all Inventive Examples, at a top embossed roll temperature of 127–130° C., are generally characterized as having bond strengths greater than or equal 2,500 grams. That is, in this bond temperature range, the bond strengths of Inventive Examples 22, 24 and 25 were about 26 to about 114 percent higher (than the bond strengths of the neat polypropylene polymer compositions (comparative examples 18, 19 and 20) and the composition comprising 5 g/10 minutes $I_2$ Ziegler-catalyzed HDPE (comparative example 21). Table 7 also shows that for ethylene/styrene interpolymers comprising 30 weight percent styrene or less, the $I_2$ melt index must be in the range of greater than 0.5 g/10 minutes to less than or equal to 10 g/10 minutes to ensure substantially improved tenacity.

Table 8 shows the inventive composition provides even more dramatic improvements in respect of elongation. Specifically, at a top embossed roll temperature of 127–130° C., the percent elongations of Inventive Examples 22, 24 and 25 were about 28 percent up to 450 percent higher than the percent elongations of comparative examples 18, 19, 20 and 21.

We claim:

1. A fiber having a diameter in a range of from 0.1 to 50 denier and comprising:
   (A) from about 0.1 percent to about 30 weight percent (by weight of the fiber) of at least one ethylene polymer having:
      i. an $I_2$ melt index less than or equal to 10 grams/10 minutes, and
      ii. a density of from about 0.85 to about 0.97 grams/ centimeters$^3$, and
   (B) a polypropylene polymer,
   wherein the ethylene polymer is an ethylene homopolymer or ethylene/α-olefin interpolymer having a density greater than or equal to 0.94 g/cm$^3$, the $I_2$ melt index of the ethylene polymer is less than 5 g/10 minutes, and wherein the fiber is characterized as being thermal bondable at 340 pounds/ linear inch (pli) and a bond roll surface temperature in the range of 127 to 137° C.

2. The fiber of claim 1, wherein the fiber comprises from about 0.5 to about 22 weight percent of the ethylene polymer.

3. The fiber of claim 1, wherein the ethylene polymer is an interpolymer of ethylene and at least one $C_3$–$C_{20}$ α-olefin.

4. The fiber of claim 1, wherein the ethylene polymer is a substantially linear ethylene/α-olefin interpolymer characterized as having:
   a. a melt flow ratio ($I_{10}/I_2$) ≧ 5.63,
   b. a molecular weight distribution, $M_w/M_n$, defined by the inequality:

$$M_w/M_n \leq (I_0/I_2)-4.63,$$

and c. a critical shear rate at the onset of surface melt fracture which is at least 50 percent greater than the critical shear rate at the onset of surface melt fracture of a linear ethylene/α-olefin interpolymer having the about same $I_2$ and $M_w/M_n$.

5. The fiber of claim 1, wherein the polypropylene polymer is a reactor grade polypropylene and has a MFR at 230° C./2.16 kg greater than or equal 20 g/10 minutes.

6. The fiber of claim 1, wherein the polypropylene polymer is a visbroken polypropylene and has a melt flow rate at 230° C./2.16 kg of greater than or equal 20 g/10 minutes.

7. The fiber of claim 1, wherein the polypropylene polymer has a coupled melt flow rate at 230° C./2.16 kg of greater than or equal 20 g/10 minutes.

8. The fiber of claim 1, wherein the polypropylene polymer is manufactured using a single-site, metallocene or constrained geometry catalyst system.

9. The fiber of claim 1, wherein the polypropylene polymer is characterized as having at least 96 percent weight isotacticity.

10. The fiber of claim 1, wherein the fibers are prepared by a melt spinning process such that the fibers are melt blown fibers, spunbonded fibers, carded staple fibers or flash spun fibers.

* * * * *